US008156532B2

(12) United States Patent
Shinkai

(10) Patent No.: US 8,156,532 B2
(45) Date of Patent: Apr. 10, 2012

(54) VIDEO PROGRAM CREATION SYSTEM, TABLE PROVIDING DEVICE, TERMINAL DEVICE, TERMINAL PROCESSING METHOD, PROGRAM, RECORDING MEDIUM

(75) Inventor: Mitsutoshi Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1071 days.

(21) Appl. No.: 10/521,246

(22) PCT Filed: Jul. 15, 2003

(86) PCT No.: PCT/JP03/08984
§ 371 (c)(1),
(2), (4) Date: Jul. 1, 2005

(87) PCT Pub. No.: WO2004/008362
PCT Pub. Date: Jan. 22, 2004

(65) Prior Publication Data
US 2006/0156364 A1 Jul. 13, 2006

(30) Foreign Application Priority Data

Jul. 15, 2002 (JP) .............................. P2002-205434
Mar. 24, 2003 (JP) .............................. P2003-080445

(51) Int. Cl.
*H04N 7/173* (2011.01)
(52) U.S. Cl. ........ 725/116; 725/115; 715/716; 715/723; 705/7.13
(58) Field of Classification Search ................... 725/105, 725/114, 115, 116, 144, 93, 146; 715/716–726, 715/733, 751, 963; 705/7.13
See application file for complete search history.

(56) References Cited

U.S. PATENT DOCUMENTS

| 5,808,662 | A * | 9/1998 | Kinney et al. ................ 348/14.1 |
| 6,088,702 | A * | 7/2000 | Plantz et al. .............. 707/103 R |
| 6,157,934 | A * | 12/2000 | Khan et al. ..................... 715/234 |
| 6,212,549 | B1 * | 4/2001 | Page et al. ...................... 709/205 |
| 6,571,255 | B1 * | 5/2003 | Gonsalves et al. ......... 707/104.1 |
| 7,069,579 | B2 * | 6/2006 | Delpuch ....................... 725/135 |

(Continued)

FOREIGN PATENT DOCUMENTS

JP 7-306778 11/1995

(Continued)

OTHER PUBLICATIONS

Kazumasa Enami, May 24, 1996: Image Processing in Program Prouction—DTTP: Desk Top Program Production (pp. 1-29).*

(Continued)

*Primary Examiner* — Brian Pendleton
*Assistant Examiner* — Nnenna Ekpo
(74) *Attorney, Agent, or Firm* — Frommer Lawrence & Haug LLP; William S. Frommer

(57) ABSTRACT

A video program production system of efficiently and flexibly producing a video program. For viewing, a composition table providing apparatus provides each terminal with composition table data in which items required for the production of the video program are arranged and a variety of information is described in the items. Each terminal, namely, each terminal of each work group is permitted to view the composition table data. Each work group views the composition table data any time in time of need, and the work group can learn the content, described in the composition table data, such as instructions for work, and work results of other groups. Based on the content, the work group performs required jobs.

7 Claims, 24 Drawing Sheets

U.S. PATENT DOCUMENTS

| | | | |
|---|---|---|---|
| 7,154,534 B2* | 12/2006 | Seki et al. | 348/207.1 |
| 7,386,833 B2* | 6/2008 | Granny et al. | 717/109 |
| 2002/0040304 A1* | 4/2002 | Shenoy et al. | 705/1 |
| 2005/0055239 A1* | 3/2005 | Farmer | 705/1 |
| 2005/0228711 A1* | 10/2005 | Lahey et al. | 705/9 |

FOREIGN PATENT DOCUMENTS

| | | |
|---|---|---|
| JP | 10 143574 | 5/1998 |
| JP | 11 15746 | 1/1999 |
| JP | 11 249777 | 9/1999 |
| JP | 11-266422 | 9/1999 |
| JP | 2001 44954 | 2/2001 |
| JP | 2001-202405 | 7/2001 |
| JP | 2001 290731 | 10/2001 |
| JP | 2002-73934 | 3/2002 |
| JP | 2002-116990 | 4/2002 |
| JP | 2002 171510 | 6/2002 |
| WO | WO 02 10963 | 2/2002 |

OTHER PUBLICATIONS

Kazumasa Enami, May 24, 1996: Image Processing in Program Production—DTTP: Desk Top Program Production (pp. 1-29).*

Kazumasa Enami, "Image Processing in Program Production", DTPP: Desk Top Program Production, May 24, 1996, pp. 69-76.

Hideki Sumiyoshi et al., "Network Based TV Production System for Cooperative Postproduction", ITE Technical Report, Jul. 7, 2000, vol. 24, No. 41, pp. 37-42.

Database Inspec [Online] The Institution of Electrical Engineers, Stevenage, GB; Jun. 1994, Gidney E et al: "CSCW for film and TV preproduction" XP002454089 Database accession No. 4745874.

Gidney, Eric et al: "CSCW for Film and TV Preproduction" IEEE Multimedia USA, [Online] vol. 1, No. 2, Jun. 1994, pp. 16-26, XP002454084 ISSN: 1070-986X Retrieved from the Internet: URL:http://ieeexplore.ieee.org/xpls/abs_all.jsp?arnumber=311657> [retrieved on Oct. 8, 2007].

Emotion, Inc.: "eMotion MediaPartner 4.0 Architecture" Internet Citation, [Online] Oct. 21, 2000, XP002454085 Retrieved from the Internet: URL:http://web.archive.org/weh/20011130171450/www.emotion.com/mediafiles/pdf/mp_architecture.pdf>[retrieved on Oct. 8, 2007].

Database Inspec [Online] The Institution of Electrical Engineers, Stevenage, GB; Jan. 2002, Boutaba R et al: "Distributed video production: tasks, architecture and QoS provisioning" XP002454090 Database accession No. 7214353.

Boutaba et al: "Distributed Video Production: Tasks, Architecture and QoS Provisioning" Multimedia Tools and Applications Kluwer Academic Publishers Netherlands, [Online] vol. 16, No. 1-2, Jan. 2002, pp. 99-136, XP002454086 ISSN: 1380-7501 Retrieved from the Internet: URL:http://www.springerlink.com/content/j456038273145g11/fulltext.pdf> [retrieved on Oct. 8, 2007].

Hideki Sumiyoshi et al: "Network-based Cooperative TV Program Production System" IEEE Transactions on Broadcasting, IEEE Service Center, Piscataway, NJ, US, vol. 42, No. 3, Sep. 1996, pp. 229-236, XP011083049 ISSN: 0018-9316.

Bafoutsou G et al: "A Comparative analysis of web-based collaborative system" Database and Expert System Applications, 2001. Proceedings. 12th International Workshop on Sep. 3-7, 2001, Piscataway, NJ, USA,IEEE, pp. 496-5000, XP010558787 ISBN: 0-7695-1230-5.

* cited by examiner

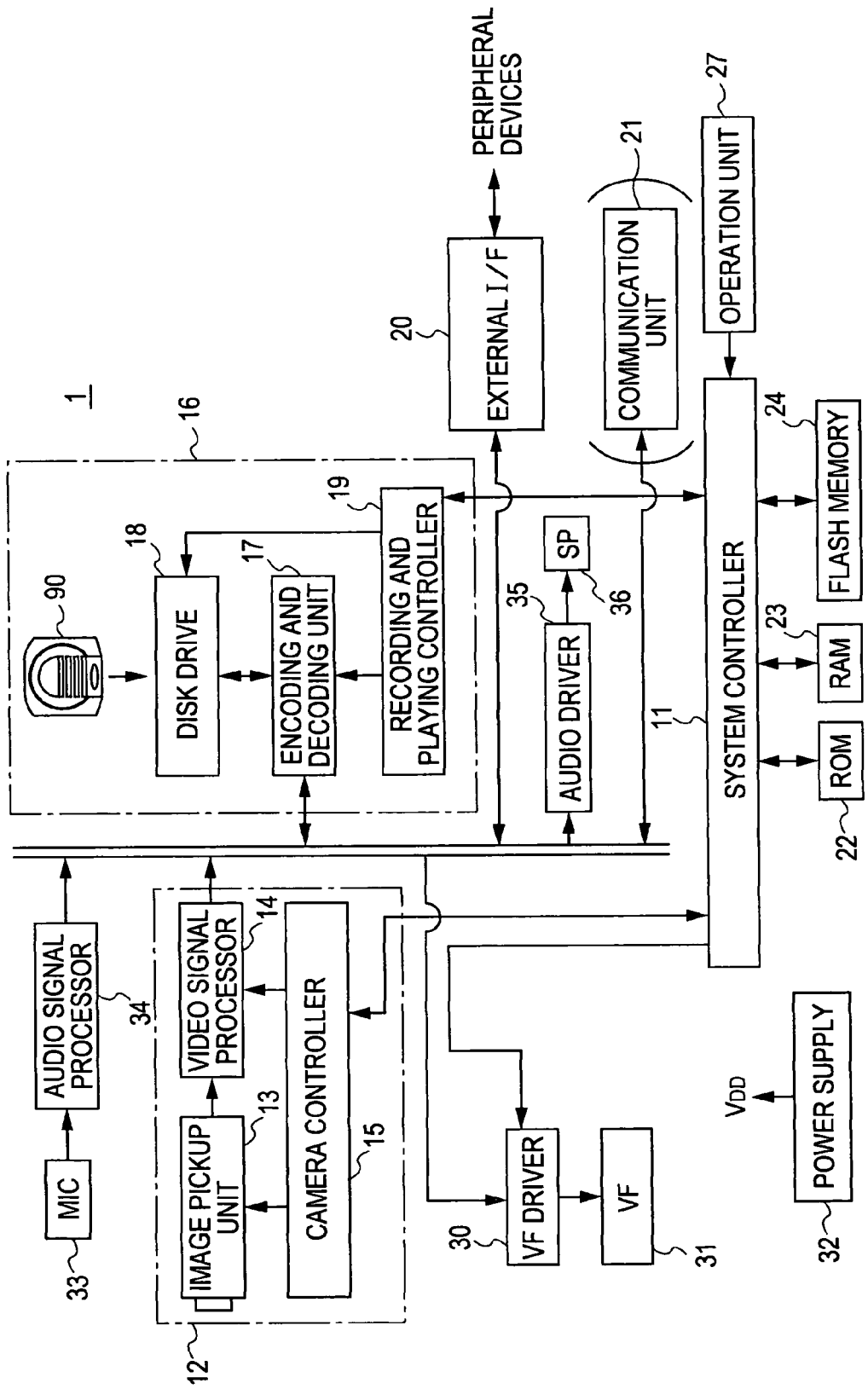

Fig.6

| SCENE (K1) | | CUT (K2) | | INTENTION (K3) | | VIDEO (K4) | MATERIAL GATHERING AND PRODUCTION INSTRUCTION (K5) | | | | | | | |
|---|---|---|---|---|---|---|---|---|---|---|---|---|---|---|
| SCENE NO. | SCENE TITLE | CUT NO. | CUT TITLE | SCENARIO | DESCRIPTION | STILL IMAGE | MATERIAL GATHERING NO. | LOCATION | DATE AND TIME OF START | DATE AND TIME OF END | PERSON IN CHARGE | EQUIPMENT | INSTRUCTION MAIL TRANSMISSION | PROGRESS |
| | | | | | | | #001 | | | | | | | |
| | | | | | | | #002 | | | | | | | |
| | | | | | | | #003 | | | | | | | |
| | | | | | | | #004 | | | | | | | |
| | | | | | | | #005 | | | | | | | |
| | | | | | | | #006 | | | | | | | |

| MATERIAL GATHERING AND PRODUCTION INFORMATION (K6) | | | | | | | | | |
|---|---|---|---|---|---|---|---|---|---|
| MEDIA ID | RECORDING SESSION * | LOCATION | DATE AND TIME OF START | DATE AND TIME OF END | PERSON IN CHARGE (HD) | EQUIPMENT | NOTE FOR MATERIAL GATHERING AND PRODUCTION | COPYRIGHT | EDIT OK MAIL |
| | | | | | | | | | |
| | | | | | | | | | |
| | | | | | | | | | |
| | | | | | | | | | |
| | | | | | | | | | |

| VIDEO (K7) | | | | | AUDIO (K8) | | | | DATA FOR MATERIAL GATHERING (K9) | | |
|---|---|---|---|---|---|---|---|---|---|---|---|
| STILL IMAGE | LOW-RESOLUTION MOVING IMAGE | ORIGINAL MOVING IMAGE | UMID | TIME | CH1 | CH2 | CH3 | CH4 | CAMERA POSTURE | CAMERA PARAMETERS | ENVIRONMENT |
| | | | | | | | | | | | |
| | | | | | | | | | | | |
| | | | | | | | | | | | |
| | | | | | | | | | | | |
| | | | | | | | | | | | |

| EDITED VIDEO (K10) | | | | | EDITED AUDIO (K11) | | | | EDIT DATA (K12) | | |
|---|---|---|---|---|---|---|---|---|---|---|---|
| STILL IMAGE | LOW-RESOLUTION MOVING IMAGE | HIGH-RESOLUTION MOVING IMAGE | UMID | TIME | CH1 | CH2 | CH3 | CH4 | EDIT EFFECT | SUPER-IMPOSE | NOTE |
| | | | | | | | | | | | |
| | | | | | | | | | | | |
| | | | | | | | | | | | |
| | | | | | | | | | | | |

Fig.7

|  |  | 1/7 | 1/10 | 1/21 | 1/28 | 2/04 | 2/11 |
|---|---|---|---|---|---|---|---|
| CONCEPT PAPER | | ◇COMPLETED | | | | | |
| DRAFT CONCEPT PAPER | | ◇COMPLETED | | | | | |
| WEBSITE POSTING | | | ◇COMPLETED | | | | |
| MATERIAL GATHERING | | | | | | | |
| | #001 | | | ◇PRELIMINARY INSPECTION | ◇FIELD SETUP | ◇VIDEO TAKING | |
| | #002 | | | | ◇PRELIMINARY INSPECTION | ◇FIELD SETUP | ◇VIDEO TAKING |
| | #003 | | | | ◇PRELIMINARY INSPECTION | ◇FIELD SETUP | ◇VIDEO TAKING |
| | #004 | | | ◇PRELIMINARY INSPECTION | ◇FIELD SETUP | ◇VIDEO TAKING | |
| | #005 | | | | ◇PRELIMINARY INSPECTION | ◇FIELD SETUP | ◇VIDEO TAKING |
| | #006 | | | | ◇PRELIMINARY INSPECTION | ◇FIELD SETUP | ◇VIDEO TAKING |

Fig. 8

○ ITEMS TO BE VIEWED
● ITEMS TO INPUTTED

Table 1

| | SCENE (K1) | | CUT (K2) | | INTENTION (K3) | VIDEO (K4) | MATERIAL GATHERING AND PRODUCTION INSTRUCTION (K4) | | | | | | |
|---|---|---|---|---|---|---|---|---|---|---|---|---|---|
| | SCENE NO. | SCENE TITLE | CUT NO. | CUT TITLE | SCENARIO | DESCRIPTION | STILL IMAGE | MATERIAL GATHERING ON LOCATION | LOCATION | DATE AND TIME OF START | DATE AND TIME OF END | PERSON IN CHARGE (+D) | EQUIPMENT | MAIL TRANSMISSION INSTRUCTION | PROGRESS |
| PLANNING AND COMPOSITION GROUP | ● | ● | ● | ● | ● | ● | ● | ● | ● | ● | ● | ● | ● | ● | ○ |
| FIELD PC/PDA | ○ | ○ | ○ | ○ | ○ | ○ | ○ | ○ | ○ | ○ | ○ | ○ | ○ | | ● |
| IMAGE PICKUP DEVICE | ○ | ○ | ○ | ○ | | | | ○ | ○ | ○ | ○ | ○ | ○ | | ● |
| PRODUCTION GROUP | ○ | ○ | ○ | ○ | ○ | ○ | ○ | ○ | ○ | ○ | ○ | ○ | ○ | | ● |
| EDITING GROUP | ○ | ○ | ○ | ○ | ○ | ○ | ○ | ○ | ○ | ○ | ○ | ○ | ○ | | ○ |

Table 2

| | MATERIAL GATHERING AND PRODUCTION INFORMATION (K6) | | | | | | | | VIDEO (K7) | | | | AUDIO (K8) | | | | DATA (K9) | | |
|---|---|---|---|---|---|---|---|---|---|---|---|---|---|---|---|---|---|---|---|
| | MEDIA ID | RECORDING SESSION * | LOCATION | DATE AND TIME OF START | DATE AND TIME OF END | PERSON IN CHARGE (+D) | EQUIPMENT | NOTE FOR MATERIAL GATHERING AND PRODUCTION | COPYRIGHT | EDIT OK MAIL | STILL IMAGE | LOW-RESOLUTION MOVING IMAGE | ORIGINAL MOVING IMAGE | UMID | TIME | CH1 | CH2 | CH3 | CH4 | CAMERA POSTURE | CAMERA PARAMETERS | ENVIRONMENT |
| PLANNING AND COMPOSITION GROUP | ○ | ○ | ○ | ○ | ○ | ○ | ○ | ○ | ○ | | ○ | ○ | | ○ | ○ | ○ | ○ | ○ | ○ | ○ | ○ | ○ |
| FIELD PC/PDA | ○ | ● | ● | ● | ● | ● | ● | ● | ● | ● | ● | ○ | | ○ | ○ | ○ | ○ | ○ | ○ | ○ | ○ | ● |
| IMAGE PICKUP DEVICE | ● | ● | ● | ● | ● | ● | ○ | ● | ○ | ● | ○ | ● | ● | ● | ● | ● | ● | ● | ● | ● | ● | ● |
| PRODUCTION GROUP | ● | ● | ● | ● | ● | ● | ○ | ● | ● | ● | ○ | ● | ● | ● | ● | ● | ● | ● | ● | ● | ● | ● |
| EDITING GROUP | ○ | ○ | ○ | ○ | ○ | ○ | ○ | ○ | ○ | | ○ | ○ | ○ | ○ | ○ | ○ | ○ | ○ | ○ | ○ | ○ | ○ |

Table 3

| | EDITED VIDEO (K10) | | | EDITED AUDIO (K11) | | | | EDIT DATA (K12) | | | |
|---|---|---|---|---|---|---|---|---|---|---|---|
| | STILL IMAGE | LOW-RESOLUTION MOVING IMAGE | HIGH-RESOLUTION MOVING IMAGE | UMID | TIME | CH1 | CH2 | CH3 | CH4 | EDIT EFFECT | SUPER-IMPOSE | NOTE |
| PLANNING AND COMPOSITION GROUP | ○ | | | ○ | ○ | ○ | ○ | ○ | ○ | ○ | ○ | ○ |
| FIELD PC/PDA | | | | | | | | | | | | |
| IMAGE PICKUP DEVICE | | | | | | | | | | | | |
| PRODUCTION GROUP | ○ | ○ | ○ | ○ | ○ | ○ | ○ | ○ | ○ | ○ | ○ | ○ |
| EDITING GROUP | ● | ● | ● | ● | ● | ● | ● | ● | ● | ● | ● | ● |

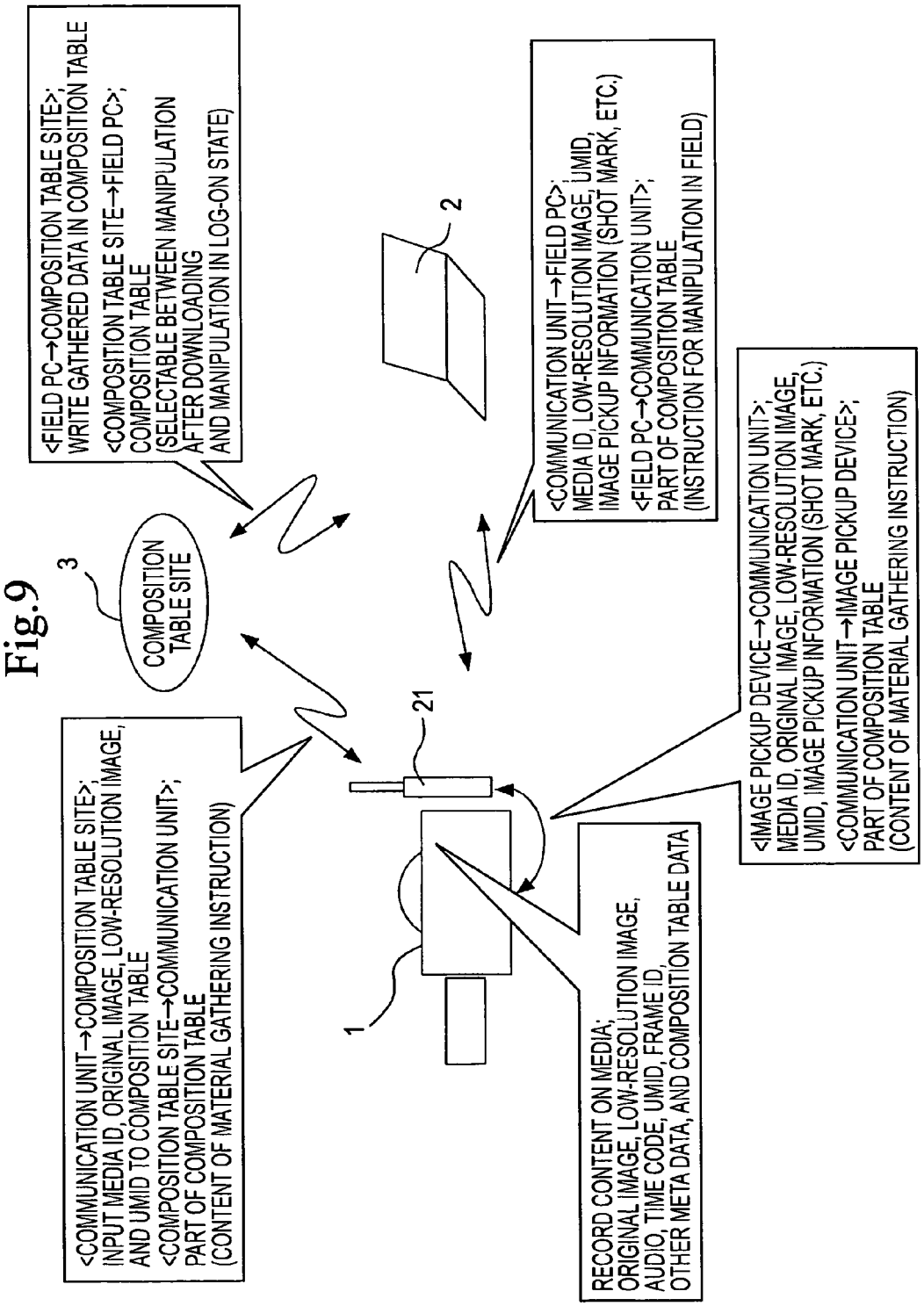

Fig.10

| SCENE (K1) | | CUT (K2) | | INTENTION (K3) | | VIDEO (K4) | MATERIAL GATHERING AND PRODUCTION INSTRUCTION (K5) | | | | | | | |
|---|---|---|---|---|---|---|---|---|---|---|---|---|---|---|
| SCENE NO. | SCENE TITLE | CUT NO. | CUT TITLE | SCE-NARIO | DES-CRIPTION | STILL IMAGE | MATERIAL GATHERING NO. | LOCATION | DATE AND TIME OF START | DATE AND TIME OF END | PERSON IN CHARGE | EQUIP-MENT | INSTRUCTION MAIL TRANS-MISSION | PROG-RESS |
| 1 | | 1 | | | | | #001 | | | | | | | |
|  |  | 2 |  |  |  |  | #002 |  |  |  |  |  |  |  |
| 2 |  | 1 |  |  |  |  | #003 |  |  |  |  |  |  |  |
|  |  | 2 |  |  |  |  | #004 |  |  |  |  |  |  |  |
| 3 |  | 1 |  |  |  |  | #005 |  |  |  |  |  |  |  |
|  |  | 2 |  |  |  |  | #006 |  |  |  |  |  |  |  |

Fig.11

| SCENE (K1) | | CUT (K2) | | INTENTION (K3) | VIDEO (K4) | MATERIAL GATHERING AND PRODUCTION INSTRUCTION (K5) | | | | | | | | | MATERIAL GATHERING AND PRODUCTION INFORMATION (K6) | | | | | | | | | |
|---|---|---|---|---|---|---|---|---|---|---|---|---|---|---|---|---|---|---|---|---|---|---|---|---|
| SCENE NO. | SCENE TITLE | CUT NO. | CUT TITLE | SCENARIO | DESCRIPTION | STILL IMAGE | MATERIAL GATHERING NO. | LOCATION | DATE AND TIME OF START | DATE AND TIME OF END | PERSON IN CHARGE (+ID) | EQUIPMENT | INSTRUCTION MAIL TRANSMISSION | PROGRESS | MEDIA ID | RECORDING SESSION * | LOCATION | DATE AND TIME OF START | DATE AND TIME OF END | PERSON IN CHARGE (+ID) | EQUIPMENT | NOTE FOR MATERIAL GATHERING AND PRODUCTION | COPYRIGHT | EDIT OK MAIL |
| 1 | | 1 | | | | | #001 | | | | | | | | | | | | | | | | | |
|   | | 2 | | | | | #002 | | | | | | | | | | | | | | | | | |
| 2 | | 1 | | | | | #003 | | | | | | | | | | | | | | | | | |
|   | | 2 | | | | | #004 | | | | | | | | | | | | | | | | | |
| 3 | | 1 | | | | | #005 | | | | | | | | | | | | | | | | | |
|   | | 2 | | | | | #006 | | | | | | | | | | | | | | | | | |

Fig.12

| SCENE (K1) | | CUT (K2) | | INTENTION (K3) | | | VIDEO (K7) | | | | | AUDIO (K8) | | | | DATA (K9) | | |
|---|---|---|---|---|---|---|---|---|---|---|---|---|---|---|---|---|---|---|
| SCENE NO. | SCENE TITLE | CUT NO. | CUT TITLE | SCE-NARIO | DES-CRIPTION | STILL IMAGE | LOW-RESO-LUTION MOVING IMAGE | ORIGINAL MOVING IMAGE | UMID | TIME | | CH1 | CH2 | CH3 | CH4 | CAMERA POSTURE | CAMERA PARA-METERS | ENVIRON-MENT |
| 1 | | 1 | | | | | | | | | | | | | | | | |
|   | | 2 | | | | | | | | | | | | | | | | |
| 2 | | 1 | | | | | | | | | | | | | | | | |
|   | | 2 | | | | | | | | | | | | | | | | |
| 3 | | 1 | | | | | | | | | | | | | | | | |
|   | | 2 | | | | | | | | | | | | | | | | |

Fig.13

| SCENE (K1) | CUT (K2) | | INTENTION (K3) | | | EDITED VIDEO (K10) | | | | EDITED AUDIO (K11) | | | | EDITED DATA (K12) | | |
|---|---|---|---|---|---|---|---|---|---|---|---|---|---|---|---|---|
| SCENE NO. | SCENE TITLE | CUT NO. | CUT TITLE | SCE-NARIO | DES-CRIPTION | STILL IMAGE | LOW-RESO-LUTION MOVING IMAGE | HIGH-RESO-LUTION MOVING IMAGE | UMID | TIME | CH1 | CH2 | CH3 | CH4 | EDIT EFFECT | SUPER-IMPOSE | NOTE |
| 1 | | 1 | | | | | | | | | | | | | | | |
| | | 2 | | | | | | | | | | | | | | | |
| 2 | | 1 | | | | | | | | | | | | | | | |
| | | 2 | | | | | | | | | | | | | | | |
| 3 | | 1 | | | | | | | | | | | | | | | |
| | | 2 | | | | | | | | | | | | | | | |

Fig.19

| SCENE (K1) | | CUT (K2) | | INTENTION (K3) | | VIDEO (K4) |
|---|---|---|---|---|---|---|
| SCENE NO. | SCENE TITLE | CUT NO. | CUT TITLE | SCENARIO | DES-CRIPTION | STILL IMAGE |
| 1 | | 1 | | | | |
|   |   | 2 | | | | |
| 2 | | 1 | | | | |
|   |   | 2 | | | | |
| 3 | | 1 | | | | |
|   |   | 2 | | | | |
| ▲ | | ▲ | | | | |
| ▼ | | ▼ | | | | |

VIDEO PROGRAM CREATION SYSTEM, TABLE PROVIDING DEVICE, TERMINAL DEVICE, TERMINAL PROCESSING METHOD, PROGRAM, RECORDING MEDIUM

TECHNICAL FIELD

The present invention relates to a video program production system appropriate for producing a broadcasting program in a television broadcasting station, a composition table providing apparatus and terminals forming the system, a terminal processing method of the terminal, a program for the terminal processing method, and a recording medium storing the program.

BACKGROUND ART

In broadcasting stations and production companies, groups (staff) perform a variety of jobs while staying in close contact with each other in a production of television programs and video contents (hereinafter referred to as a video program).

FIG. 24 illustrates a work flow for a video program production. The job content of each group is briefly shown. Broken lines represent a request from one group to another to perform a job, a request for information, a notification, a supply of produced materials, and the like.

When a video program is produced, a planning and composition group develops a concept, plans a program, and studies and discusses the content of the program, and then finalizes the composition of the program.

Based on the plan and composition, the plan and composition group sends a project book to each group, and issues job instructions.

The work groups include a material gathering group, an office work group, an equipment group, an information group, a speech group, a CG (computer graphics)/SI (superimpose) group, an editing group, a performer group, a material group, a storage group, etc.

The material gathering group gathers materials in response to instructions. The group prepares for a material gathering operation, and requests the office work group to perform required procedures and paper work. The material gathering group also requests the material group to prepare equipment for preliminary inspection.

The office work group performs paper work for material gathering procedure, material gathering permit, arrangement for business trip, and contracts.

The equipment group procures equipment required for the preliminary inspection for the material gathering.

The material gathering group performs the preliminary inspection after the material gathering procedure and the procurement of the equipment are complete. The material gathering group transfers information collected in the preliminary inspection and a video obtained on a trial basis to the planning and composition group.

The information group studies information relating to the video program to be produced, and reports the information to the planning and composition group.

The speech group produces a speech draft, and submits the speech draft to the planning and composition group.

The CG/SI group analyses the content of a video required for the video program, and produces trial data to be checked in computer graphics and superimposing. The CG/SI group transfers the data to the planning and composition group.

The editing group analyzes the content of the video program to be produced, and produces an edit instruction sheet.

The performer group analyzes the content of performance required for the video program to be produced, and designs a plan of casting of performers and anchorman, and transfers the plan to the planning and composition group.

The material group studies video materials and music, tentatively procures the video materials and music, and transfers the procured the video materials and music to the planning and composition group.

The planning and composition group studies and confirms information, materials, video, music, etc. supplied from the other groups. The planning and composition group issues instructions to each group in accordance with the study results as necessary.

The speech group produces a speech sheet, and transfers the speech sheet to the material gathering group.

The material gathering group receives equipment for a real material gathering operation from the equipment group, and performs the real material gathering operation together with performers planned by the performer group. Video and audio data captured in the real material gathering operation are transferred to the planning and composition group.

The planning and composition group checks the content of the material gathering operation by performing off-line editing and pre-viewing, and transfers the gathered material to the editing group.

The CG/SI group produces final data for computer graphics and superimposing, and transfers the final data to the editing group.

The performer group records a narration, and transfers data of the narration to the editing group.

The material group selects and modifies the material video to be inserted into the video program, and music such as BGM (background music), and transfers the document video and the music data to the editing group.

After modifying the edit instruction sheet, the editing group performs an editing operation on the captured video, CG/SI, document video, music, and narration in accordance with the editing instruction sheet, thereby finalizing the video program.

The planning and composition group finally checks the video program as a complete packet.

The video and audio data obtained in the material gathering operation is transferred to the storage group for storage as video/audio document.

The video program as the complete packet is transferred to the storage group for storage.

The above-referenced work flow is one example only, and in practice, more detailed jobs are performed in practice. Each group thus performs jobs in cooperation with other groups with reference to the progress of the other groups.

Ideally, each group performs required jobs in a flexible manner while keeping close contact with the other groups to keep status information of the other group updated.

However, it is difficult to exchange detailed progress reports with each other among the groups, and the exchanging of the detailed progress reports increases burden on each group, thereby degrading work efficiency.

Requests and documents are exchanged in the form of paper documents.

Group-to-group communications shown in FIG. 24 are performed at the moment each job step is completed.

A delayed job in one group easily affects the progress of another group, and a content of instructions is difficult to correct and modify.

It is extremely difficult to cause a number of work groups to perform the jobs thereof efficiently in cooperation.

The instructions from the planning and composition group are issued in the form of paper documents.

For example, the material gathering group gather materials and takes video in accordance with scenarios, scripts, and storyboard. The CG/SI group produces computer graphics in accordance with these documents. Similarly, the material group selects document video and music in accordance with the instruction sheet.

The concept of the project is difficult to convey in writing, and the material gathering and production satisfying the concept of the project are difficult.

The instructions themselves are difficult to correct and modify.

In the editing operation, arranging the video content, captured in the material gathering operation, in order; is not so easy, and performing the editing operation in alignment with the concept of the project is not so easy. The instructions are issued in writing, and the content of the video taking performed by the material gathering group is described in handwritten memo. It is therefore not easy to identify a location in a scenario or a script corresponding to a good scene and a good cut.

More specifically, performing the jobs in an efficient manner with the groups cooperating with each other is difficult in the known video program production. Each group has difficulty in properly performing jobs in response to requests from the other groups with the concept of the project maintained in alignment.

A slight correction and modification are not easy to undergo in the plan and composition.

Known techniques are disclosed in Japanese Unexamined Patent Application Publication Nos. 2001-184802, 2001-216763, and 2001-290731.

DISCLOSURE OF INVENTION

It is an object of the present invention to allow a video program to be produced by a plurality of groups in an efficient manner and to allow a material gathering process and an editing process in the video program production to be easily and properly performed in alignment with a concept of a project of the video program production.

A video program production system of the present invention includes a composition table providing apparatus, and a plurality of terminals communicable with the composition table providing apparatus.

Each of the composition table providing apparatus in the video program production system of the present invention and the composition table providing apparatus of the present invention includes storage means for storing composition table data containing items required for a production of a video program and a variety of information described on a per item basis, and control means for providing, for viewing, the composition table data to each of the terminals and processing information inputting from each of the terminals to the composition table data.

In response to inputting of information from one (or a plurality) of terminals to the composition table data, the control means performs a process of transmitting notice information to another terminal.

Each of the terminals in the video program production system and the terminal of the present invention includes acquisition means for acquiring the composition table data by communicating with the composition table providing apparatus, display control means for causing a display to display the composition table data acquired by the acquisition means, input information generating means for generating information to be inputted to a predetermined item of the composition table data, and input information transmitting means for transmitting the input information to the composition table providing apparatus.

The terminal further includes composition table transmitting means for generating the composition table data including the items required for the production of the video program, and transmitting the composition table data to the composition table providing apparatus.

In the terminal, the input information generating means generates the input information to an item relating to one of a material gathering instruction and a production instruction, in the composition table data.

The input information generating means generates the input information to an item relating to one of a material gathering and a production, in the composition table data.

The input information generating means generates the input information to an item relating to one of a content of a video gathered or produced, and a content of an audio gathered or produced, in the composition table data.

The input information generating means generates the input information to an item relating to editing of the composition table data.

The input information generating means generates the input information representing an end of the information inputting to the items required in the composition table data.

The input information generating means automatically generates the input information to the composition table data. The input information generating means generates the input information to the composition table data in response to an input operation.

The acquisition means acquires only information relating to a part of the items of the composition table data.

The terminal further includes recording means for recording the composition table data, acquired by the acquisition means, onto a recording medium. The terminal further includes recording means for recording, together with video data and audio data, the composition table data, acquired by the acquisition means, onto a recording medium.

The input information generating means generates input information for updating the composition table data in the composition table providing apparatus in response to updating of the composition table data recorded on the recording medium.

A terminal processing method of the present invention includes acquiring, from a composition table providing apparatus, composition table data containing items required for a production of a video program and a variety of information described on a per item basis (an acquisition step), causing a display to display the acquired composition table data (a display step), generating information to be inputted to each item of the composition table data (an input information generating step), and transmitting the generated input information to the composition table providing apparatus (a transmitting step).

The terminal processing method further includes generating the composition table data including the items required for the production of the video program, and transmitting the composition table data to the composition table providing apparatus (a composition table generating step).

Input information is generated for an item relating to one of a material gathering instruction and a production instruction in the composition table data.

Input information is generated for an item relating to one of a material gathering and a production in the composition table data.

Input information is generated for an item relating to one of a content of a video gathered or produced, and a content of an audio gathered or produced, in the composition table data.

Input information is generated for an item relating to editing of the composition table data.

Input information representing an end of the information inputting to the items required in the composition table data is generated.

Information to the composition table data is automatically generated. Input information to the composition table data is generated in response to an input operation.

Only information relating to a part of the items of the composition table data is generated when the composition table data is acquired from the composition table providing apparatus in the acquisition step.

A process of recording the composition table data, acquired in the acquisition step, onto a recording medium, or a process of recording, together with video data and audio data, the composition table data, acquired in the acquisition step, onto a recording medium is performed.

Input information for updating the composition table data in the composition table providing apparatus is generated in response to updating of the composition table data recorded on the recording medium.

A program of the present invention causes an information processing apparatus to perform the above-referenced terminal processing method.

A recording medium of the present invention stores the program.

In accordance with the present invention, the composition table providing apparatus supplies each terminal for viewing with the composition table data containing items required for the production of the video program and the variety of information described on a per item basis. Each terminal, namely, each work group performs required jobs based on the content of the composition table data viewed, for example, work results of another work group. The work results are transmitted as the input information to the composition table data.

Each work group learns the status of the other groups by viewing the composition table data, and thus recognizes the progress of each job and the content of video. Each work group thus flexibly proceeds in the execution of each job in response to the status of the other groups.

In accordance with the present invention, the composition table providing apparatus supplies each terminal for viewing with the composition table data containing items required for the production of the video program and the variety of information described on a per item basis. The composition table data is viewed on each terminal, namely, the terminal of each work group. Each work group can thus know job instructions and the work results of the other groups, and can perform required jobs based on the content of the composition table data. By viewing the composition table data at any time in time of need, each work group confirms instructions, and checks the statuses of the other work groups, and video and audio as a result of job results. The job efficiency of each group is thus substantially heightened. The modification of instructions is immediately performed.

The terminal generates the composition table data including the items required for the production of the video program, and transmits the generated composition table data to the composition table providing apparatus. Since the composition table providing apparatus receives basic composition table data, each terminal can view the composition table data. Such a terminal is appropriate as a terminal for the planning and composition group.

The terminal generates the input information for the item relating to the material gathering and the production instruction in the composition table data and transmits the input information to the composition table providing apparatus to write the input information onto the composition table data. The instructions for the material gathering and production are thus provided to the other groups. It is easy to add or modify instructions at any time.

By viewing the composition table data, another terminal recognizes the instructions and a modification in the instructions. Production and direction of the video program are flexibly performed. Such a terminal is appropriate as a terminal for the planning and composition group.

The terminal generates the input information for the item relating to the material gathering and the production in the composition table data and transmits the input information to the composition table providing apparatus to write the input information onto the composition table data. The composition table data is thus concurrently updated. Information concerning the material gathering and information concerning the production are transferred to another work group as necessary. Such a terminal is appropriate as a terminal for the material gathering group and the production group.

The terminal generates the input information for the item relating to one of the content of the video gathered or produced and the content of the audio gathered or produced in the composition table data, and transmits the input information to the composition table providing apparatus to write the input information on the composition table data. The composition table data is thus concurrently updated. Video and audio information collected from the material gathering and production is transferred to another work group as necessary. Such a terminal is appropriate as a terminal for the material gathering group and the production group.

The terminal generates the input information for the item relating to the editing of the composition table data, and transmits the input information to the composition table providing apparatus to write the input information on the composition table data. The composition table data is thus concurrently updated. Information concerning the editing and the editing results are transferred to another work group as necessary. Such a terminal is appropriate as a terminal for the editing group.

When the terminal acquires the composition table data from the composition table providing apparatus for viewing, only a part of the composition table data may be acquired. A terminal having a relatively low communication performance has no problem with viewing the composition table data even if the composition table data is large in size. For example, the material gathering group views items relating to the material gathering operation only.

The acquired composition table data is stored in a recording medium, such as a hard disk in the terminal. Since the composition table data is properly stored in the terminal side, inputting to and manipulation of the composition table data are properly performed. For example, since an off-line editing operation is conveniently performed, the terminal is appropriate for use in a video taking operation in a field.

The terminal then generates the input information for updating the composition table data in the composition table providing apparatus in response to updating of the composition table data stored in the recording medium. In this way, the inputting to and the manipulation of the composition table on the video taking field are accounted for in the composition table data in the composition table providing apparatus. The composition table data is concurrently updated. In particular, the terminal is appropriate for use as a terminal for the material gathering group, the production group, the editing group, etc.

The terminal generates the input information representing the end of the information inputting to the items required in the composition table data, and each group can learn the ends of jobs of the other groups from the composition table data. The composition table providing apparatus transmits the notice information to the other groups in response to the inputting of such particular information, so that the jobs are smoothly performed among the groups.

Each group performs the job while viewing and inputting data to the composition table data on each terminal. Instruction transmission, requests, confirmation of job results, information notice transmission, job progress learning, etc. are easily, quickly and properly performed. Production efficiency is heightened. The groups flexibly modify the composition table data, and instructions, and modify or correct instructions and the content of the instructions.

Since the video and audio are exchanged among the groups, the underlying concept of a project and images are easy to convey. The material gathering and the production of the video program are performed in alignment with the underlying concept of the project.

If description information of the content of the video program is itemized together with video and music information in the composition table data, an appropriate editing operation is easily performed. Each group thus enjoys an optimum working environment.

The video program production system and the terminal, having the above-referenced advantages, are provided with the program of the present invention incorporated. The terminal and the terminal processing method, having the above-referenced advantages, are provided with the recording medium of the present invention storing the program incorporated.

BRIEF DESCRIPTION OF THE DRAWINGS

FIG. 5 is a block diagram of an image pickup device of the embodiment of the present invention.

FIG. 6 illustrates a composition table of the embodiment of the present invention.

FIG. 7 illustrates a production schedule table of the embodiment of the present invention.

FIG. 8 illustrates a viewing and inputting process to the composition table of the embodiment of the present invention.

FIG. 9 illustrates communications between the image pickup device and a field PC, and a composition table site in accordance with the embodiment of the present invention.

FIG. 10 illustrates the viewing and inputting process to the composition table by a planning and composition group in accordance with the embodiment of the present invention.

FIG. 11 illustrates the viewing and inputting process to the composition table by a material gathering group in accordance with the embodiment of the present invention.

FIG. 12 illustrates the viewing and inputting process to the composition table by the material gathering group in accordance with the embodiment of the present invention.

FIG. 13 illustrates the viewing and inputting process to the composition table by an editing group in accordance with the embodiment of the present invention.

FIG. 19 explains a simplified composition table in accordance with the embodiment of the present invention.

BEST MODE FOR CARRYING OUT THE INVENTION

Figure 1:
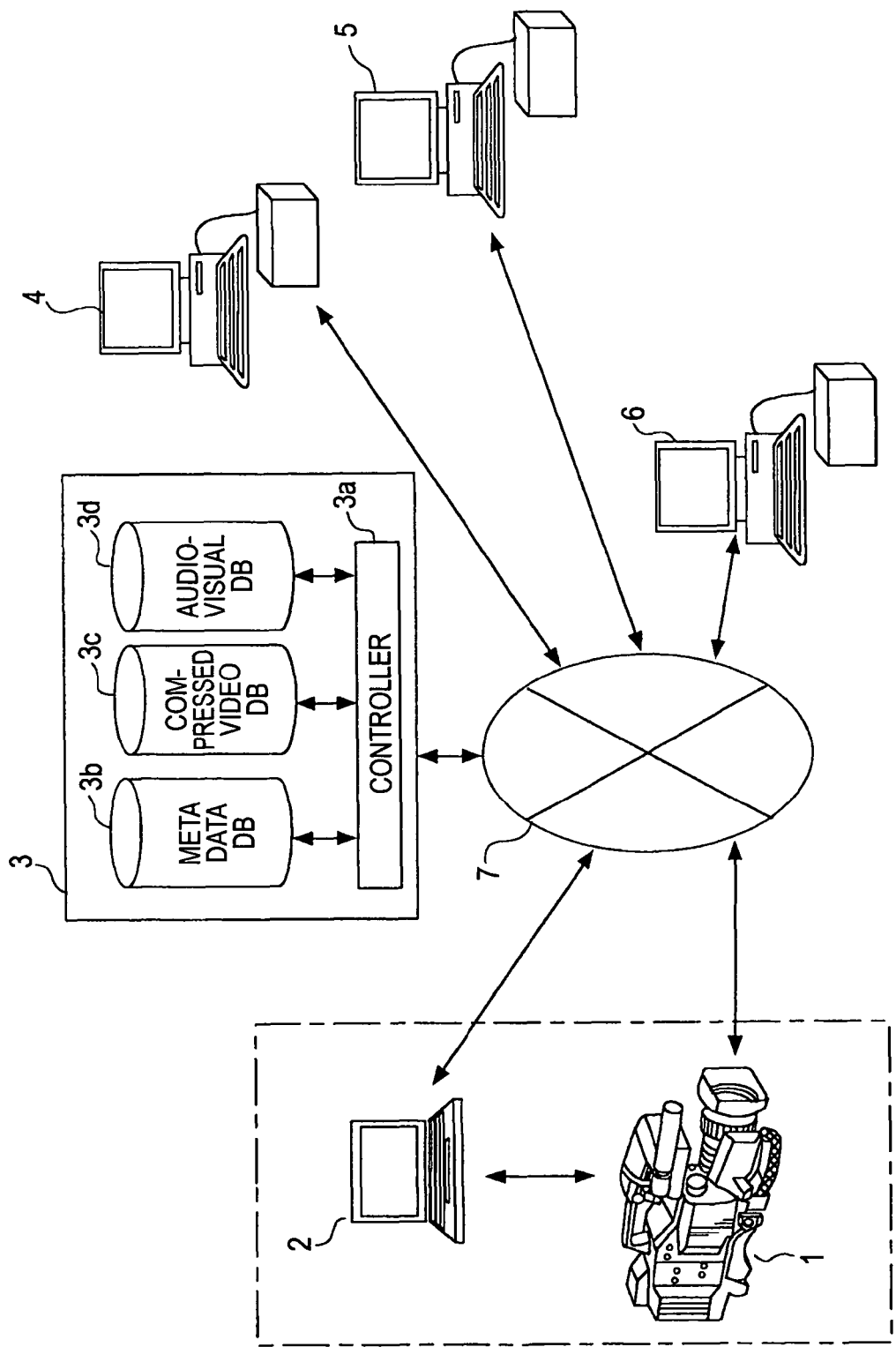
FIG. 1 illustrates a video program production system in accordance with one embodiment of the present invention.

The embodiments of the present invention are described in the order of the list below.
1. Video program production system
2. Production procedure
3. Structure of server
4. Structure of terminal
5. Structure of image pickup device
6. Composition table
7. Function of each element
8. Example of access to the composition table
9. Production job using the composition table
10. Process example
11. Modifications and program 1. Video Program Production System FIG. 1 illustrates the structure of a video program production system of the embodiment of the present invention.

The video program production system basically includes a composition table site 3, and a variety of terminals connected to the composition table site 3 via a network 7. The network 7 can be a public communication line, a satellite communication line, or a dedicated line.

As shown in FIG. 1, the terminals include an information processing apparatus (personal computer) 4 for a planning and composition group, an information processing apparatus 5 for a production group, an information processing apparatus 6 for an editing group, and an image pickup device 1 and a field PC (personal computer) 2 for a material gathering group.

The field PC 2 of the material gathering group can be a mobile information processing apparatus (such as a personal computer or a PDA (personal digital assistant)). The image pickup device 1 having communication function serves as a communication terminal linked with the outside via the network 7.

Each of the terminals (1-6) gains access to the composition table site 3 via the network 7, thereby acquiring or transmitting information.

Figure 24:
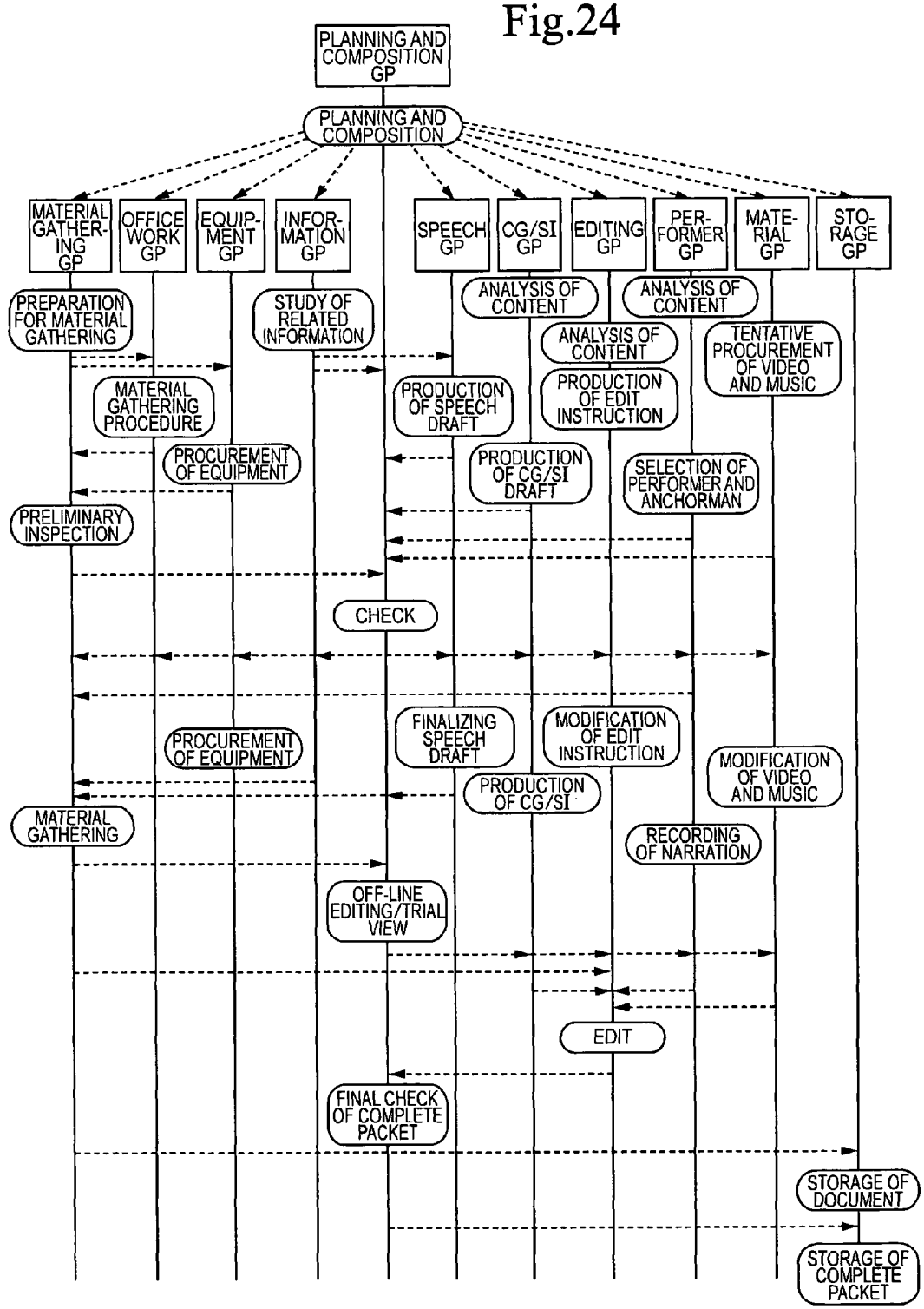
FIG. 24 is a work flow of a video production system of a known art.

As previously discussed with reference to FIG. 24, the work groups for the video program production include a planning and composition group, a material gathering group, an office work group, an equipment group, an information group, a speech group, a CG/SI group, an editing group, a performer group, a material group, a storage group, etc.

For simplicity of explanation, FIG. 1 illustrates only the terminals (1-6) of the planning and composition group, the material gathering group, a production group, and the editing group. The other groups, not shown, are equally equipped with terminals thereof, such as information processing apparatuses, and gain access to the composition table site 3 via the network 7.

The production groups of FIG. 1, including the CG/SI group, the performer (narration) group, and the material group, produce a video and audio for use in a video program besides the material group.

In the following discussion, accessing of the terminals (1-6) of the planning and composition group, the material gathering group, the production group, and the editing groups to the composition table site 3 is mainly described. The other groups performs required access operations in accordance with job contents.

The composition table site 3 is set up for the video production group to share the content of the composition table with the other groups. More specifically, the composition table site 3 is constructed as a WWW site (web site) so that the terminal of each group gains access to a signal database via a network.

The composition table is table data that includes items required for the production of a video program and a variety of information described on a per item basis. For example, the content of a video work is divided into scenes or cuts, and the scenes or the cuts are tabularized as a composition table. The composition of the scenes and the cuts (i.e., the number and sequence of the scenes and the cuts), titles, and description of the scenes and the cuts, and additional information are described in the composition table. The composition table, which is something like a storyboard, contains most of information required for the video work. The specific content of the composition table will be discussed later.

The composition table site 3, as a website, includes a controller 3a managing access from the terminals (1-6), and databases 3b, 3c, and 3d storing data forming the composition table.

The meta database 3b stores item information of the composition table (frame information), text data inputted to each item, and still image data. The meta database 3b thus stores the body of the data as the composition table.

The video and music database 3d stores video data and audio data inputted into the composition table by the material gathering group and the production group. The data inputted here is a video that is actually used for the video program. The video data and the audio data are stored with a predetermined item of the composition table linked therewith in the meta database 3b so that the video data and the audio data stored in the video and music database 3d are managed as the content of the composition table.

The compressed video database 3c stores a compressed version of the video data (hereinafter referred to as low-resolution video data) inputted to the composition table by the material gathering group or the production group.

The low-resolution video data is made by compressing the original video data stored in the video and music database 3d into low-quality video data having a small amount of data. The low-resolution moving image is used for a pre-editing process.

The compressed data is also stored with a predetermined item of the composition table linked therewith in the meta database 3b so that the compressed data is managed as the content of the composition table.

2. Production Procedure

Figure 2:
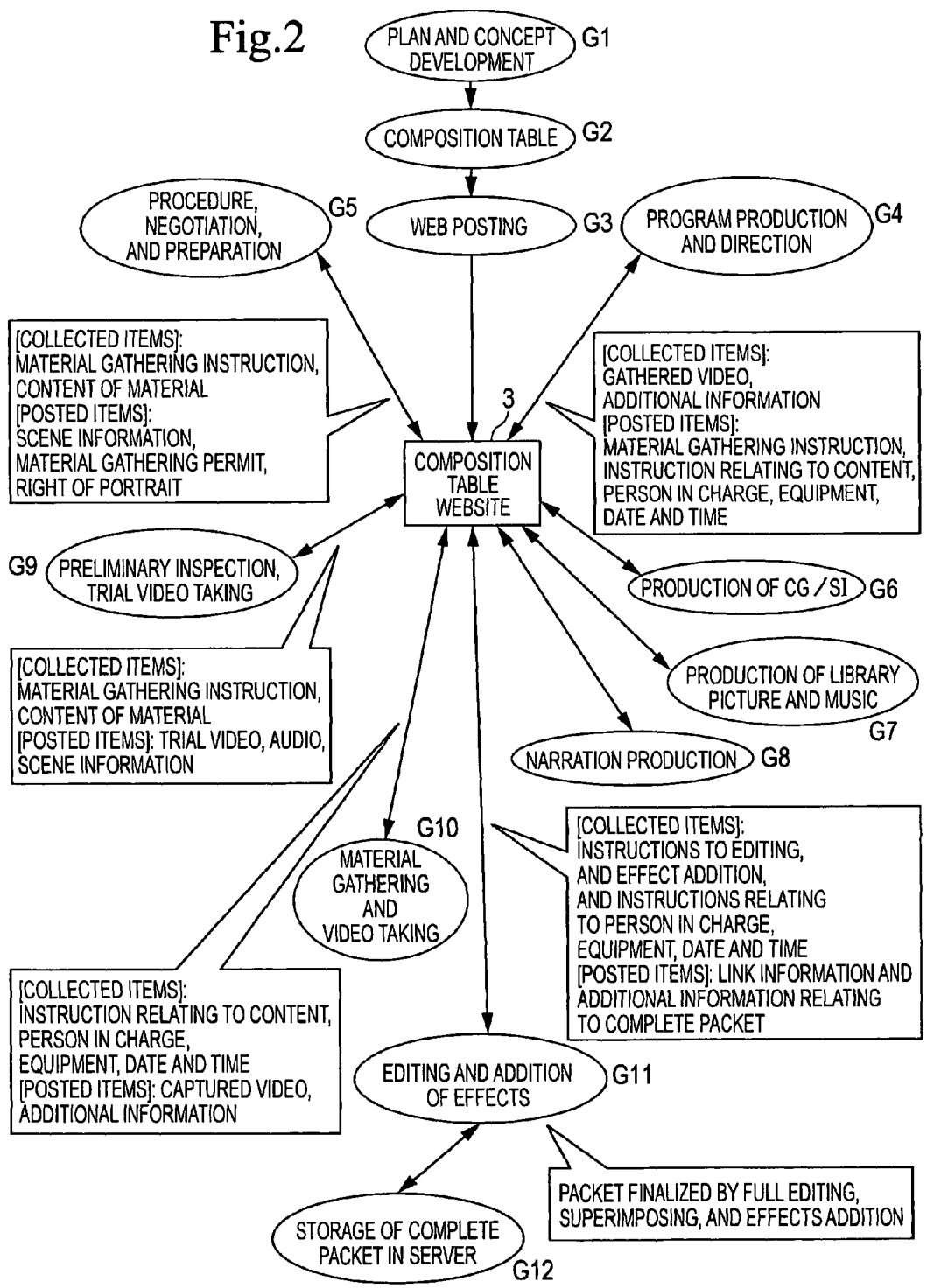
FIG. 2 illustrates a work flow of producing a video program in accordance with the embodiment of the present invention.

A production procedure of the system of FIG. 1 for producing a video program is described below with reference to FIG. 2.

When the video program is produced, the concept and plan of the video program, such as the content of the program are determined, and then the composition of the video program is determined in alignment with the concept and plan (G1).

A composition table is produced taking into consideration the content and composition of the video program (G2).

Data of the produced composition table is uploaded from the information processing apparatus 4 of the planning and composition group to the composition table site 3. In other words, the composition table is web posted (G3).

Each work group then gains access to the composition table site 3 from the terminal thereof for viewing, and inputs information to the composition table.

In this arrangement as shown, jobs including program production and direction (G4), procedure/negotiation/preparation (5), CG/SI production (G6), production of library video and music (G7), narration production (G8), preliminary inspection and trial video taking (G9), material gathering and video taking (G10), editing and effect addition (G11) are performed by respective groups in charge.

After being edited in the editing and effect addition job (G11) and finally checked in the program production and direction job (G4), a video program is completed and stored in a recording medium in a complete packet server storage (G12).

Each group performs the job instructed and requested while accessing the composition table site 3 to view the composition table. Furthermore, each group inputs messages, a progress report, job information, and produced and captured video and audio to the composition table.

Each work group recognizes the statuses of the other groups, and can select and execute a job to be performed by viewing the composition table.

The content of each job is described with reference to FIG. 2.

<G2: Production of the Composition Table, and G3: Web Posting>

This job is performed by the planning and composition group. The planning and composition group produces the composition table at the planning phase of the video program. The composition table is produced using the information processing apparatus 4 of FIG. 1, and stored as computer data. The composition table includes table-formatted items arranged for each scene or cut as shown in FIG. 6.

When the frame of the table is constructed as the tabularized data, instructed contents are entered in items relating to the underlying concept of the plan, the material gathering and production within prepared items.

The material gathering and the construction are scheduled, and a production schedule table of FIG. 7 to be discussed later is also created.

When the composition table data, including composition frame data, input data, such as instructions, and production schedule table data are created, the composition table data is uploaded to the composition table site 3 separately or all at a time.

The uploaded composition table data is stored in the meta database 3*b*. Each group can now check the composition table by accessing the composition table site 3 to view the project concept and the instructions of the planning and composition group.

<G5: Procedure/Negotiation/Preparation>

This job is performed by the office work group.

The office work group accesses the composition table site 3 from a terminal, not shown in FIG. 1, to view the composition table, and checks a planned material gathering and an instruction for the planned material gathering. The office work group performs paper work for necessary contact and negotiation, material gathering permit, right of portrait, and copyright, all these required to perform the material gathering. The office work group accesses the composition table site 3 subsequent to the end of or in the middle of the paper work to enter information collected from the paper work to the composition table.

<G6: CG/SI Production, G7: Production of Library Video and Music, and G8: Narration Production>

These jobs are performed by the production group.

The production group accesses the composition table site 3 from the terminal (the information processing apparatus 5 of FIG. 1) to view the composition table and the production schedule table to check the content of the planned material gathering and the material gathering instruction. The production group produces data for computer graphics and superimposing, selects or produces library video and music, and produces narration.

Information relating to the production of these data, and produced data are inputted to the composition table. The actual video data and the audio data are stored in the video and music database 3*d* with the composition table data linked therewith.

<G9: Preliminary Inspection and Video Pre-Viewing, and G10: Material Gathering and Video Taking>

These jobs are performed by the material gathering group.

The material gathering group accesses the composition table site 3 from the terminal (such as the field PC 2 or the image pickup device 1 of FIG. 1) to view the composition table to check the content of the planned material gathering and the material gathering instruction. The material gathering group also checks the material gathering permit and information concerning equipment, input by the office work group. The material gathering group also checks the production schedule table.

In view of these data, the material gathering group performs the preliminary inspection, trial video taking, pre-viewing, and video taking for the real material gathering.

The material gathering group enters, onto the composition table, video taken during the preliminary inspection, video and audio captured during the real material gathering, and a variety of information during the video taking, such as additional information of the captured video relating to equipment, persons in charge, date and time. These pieces of information are manually entered onto the composition table in each item. Automatic information inputting is also possible. The video data and audio data, actually captured, are stored in the video and music database 3*d* with the composition table data linked therewith.

<G11: Editing and Effect Addition>

This job is performed by the editing group.

The editing group accesses the composition table site 3 from the terminal (the information processing apparatus 6 of FIG. 1) to view the composition table to check the content of the planned material gathering and instructions regarding the editing and effects addition process. The editing group also checks the video and audio, inputted by the material gathering group, and information relating to the inputted video and audio, such as information concerning equipment, and date and time of the material gathering. Furthermore, the editing group checks the video and audio, inputted by the production group, and information relating to the inputted video and audio.

The editing group performs pre-editing, and editing, adds video effects, and audio effects, and inputs the edit related information and the edited video and audio to the composition table.

The actually edited video data and audio data are stored in the video and music database 3*d* with the composition table data linked therewith.

<G4: Program Production and Direction>

This job is performed by the planning and composition group.

After web posting the composition table data, the planning and composition group accesses the composition table site 3 as necessary to view the composition table, checks the information inputted by each group, and inputs instruction information onto the composition table as necessary.

The planning and composition group checks the progress of the job of each group, and the captured and produced video and audio, and inputs instruction information for job proceed instruction and content modification instruction for each group to the composition table. The planning and composition group thus generally directs the video program production process.

As described above, each group performs the instructed job while viewing the composition table posted on the composition table site 3, and inputs information onto the composition table as necessary.

3. Structure of Server

The hardware structure of the composition table site 3, serving as a server of the composition table to the terminals (1-6) of the groups, is described below with reference to FIG. 3.

Figure 3:
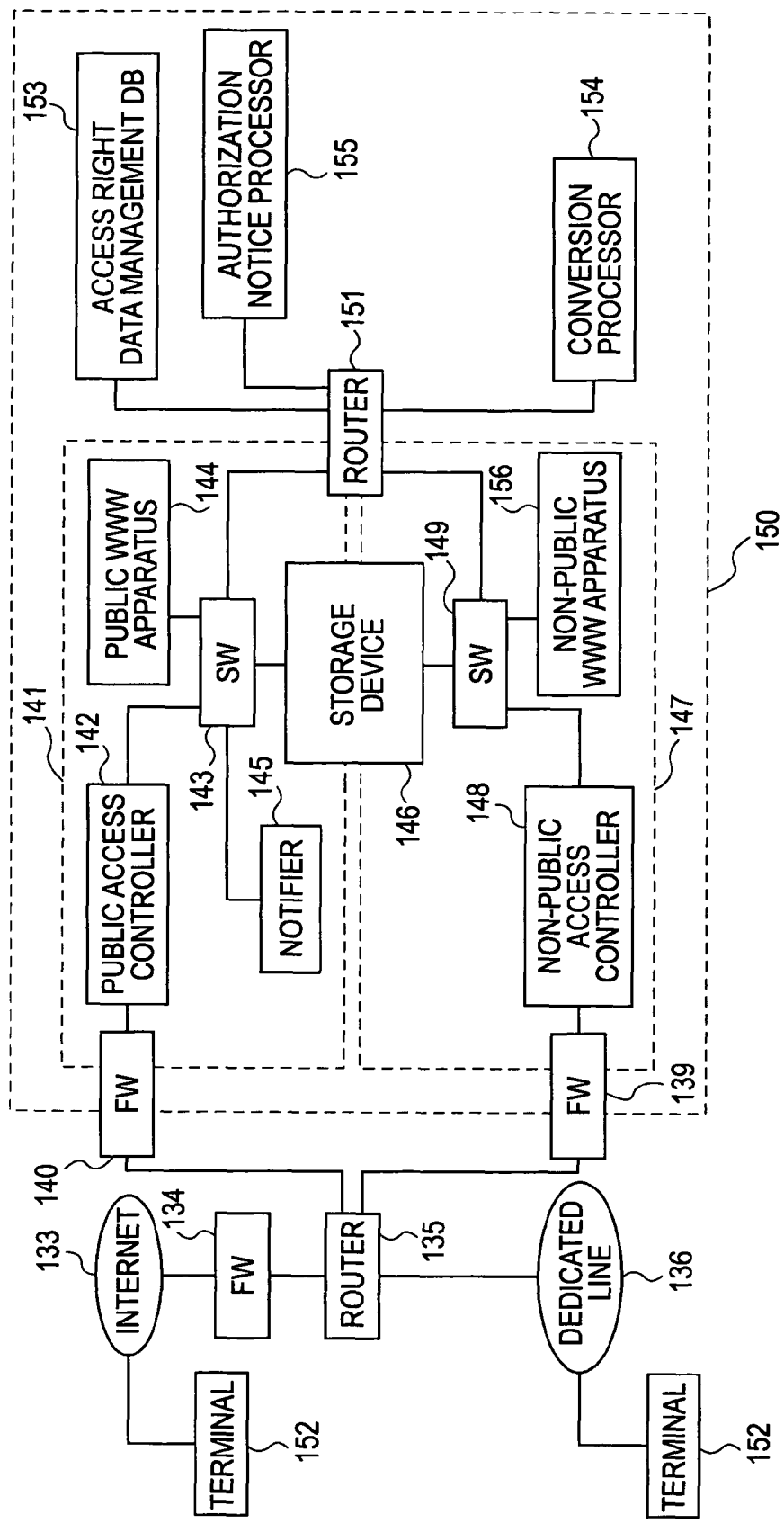
FIG. 3 is a block diagram of a composition table providing apparatus of the embodiment of the present invention.

FIG. 3 shows mainly a center server 150. The center server 150 can be regarded as the controller 3*a* of FIG. 1. Each of the databases 3*b*, 3*c* and 3*d* of FIG. 1 is shown as a storage device 146 of FIG. 3. A terminal 152 of FIG. 3 corresponds to each of the terminals (1-6).

As shown in FIG. 3, the center server 150 includes a public segment section 141 that responds to an access from a terminal 152 via the Internet 133 as an example of the network 7, a non-public segment section 147 that responds to an access from the terminal 152 via a dedicated line 136 as an example of the network 7, a router 151 that connects different LANs (Local Area Networks), an access right data management DB 153 that manages an access right of the authentic terminal 152 that accesses the center server 150, an authorization notice processor 155 that requests the designated terminal 152 to send an authentication notice, and a conversion processor 154 that converts a format of the data of video into a designated format.

As shown in FIG. 3, the terminal 152 is connected to the center server 150 via a firewall 134 and a router 135.

The public segment section 141 includes a firewall 140 that rejects unauthorized accesses other than an access from the terminal 152 via the Internet 133, a public access controller 142 that controls the access from the terminal 152, a notifier 145 that notifies the terminal 152 of a variety of information, a switch 143 that selectively makes connection in the same LAN, a storage device 146 having a storage area for storing data, and a public WWW (World Wide Web) apparatus 144 for providing information required by the terminal 152.

The public access controller 142 performs an authentication process of a user of the terminal 152 that attempts to access the public segment section 141. If the user is successfully authenticated, the public access controller 142 permits the terminal 152 to access the public segment section 141.

Subsequent to the authentication process, in cooperation with the public WWW apparatus 144, the public access controller 142 controls the accessing of the terminal 152 to public storage areas in the access right data management DB 153 and the storage device 146.

The notifier 145 and the storage device 146 are used for the terminal 152 that attempts to access the non-public segment section 147. The storage device 146 stores file data, etc.

In cooperation with the public access controller 142, the public WWW apparatus 144 controls the access process of the terminal 152 to the storage device 146 via the Internet 133 and the dedicated line 136, and causes a display of the terminal 152 to present a required information screen.

The non-public segment section 147 includes a firewall 139 that rejects unauthorized accesses performed by any terminal other than the terminal 152 via the dedicated line 136, a non-public access controller 148 that controls the access from the terminal 152, a switch 149 that selectively makes connection within the same LAN, and a non-public WWW apparatus 156 that provides information required by the terminal 152.

The non-public access controller 148 performs an authentication process of a user of the terminal 152 that accesses the non-public segment section 147. If the user is successfully authenticated, the non-public access controller 148 permits the terminal 152 to access the non-public segment section 147.

In cooperation with the non-public WWW apparatus 156, subsequent to the authentication process, the non-public access controller 148 controls the accessing of the terminal 152 to non-public storage areas in the access right data management DB 153 and the storage device 146.

In cooperation with the non-public access controller 148, the non-public WWW apparatus 156 performs a process relating to the accessing of the terminal 152 to the storage device 146 via the dedicated line 136, and causes a display of the terminal 152 to display a required information screen.

The access right data management DB 153 is a management device, and manages access rights of the terminal 152 and a group holding the terminal 152 to directories, file data, and comment data.

In response to an authentication request from one of the public access controller 142 and the non-public access controller 148, the access right data management DB 153 authenticates the terminal 152 as to eligibility for storage service, based on personal identification information (ID) and a password (PW) of a user (person in charge) belonging to the managed terminal 152.

A determination of whether to permit accessing to the directory, the file data and the comment data is performed based on access right information set in access right data.

The access right data contains information relating to attributes of the directory and subdirectories, information relating to attributes of the file data, and information relating to the comment data.

In response to a request from the terminal 152, the authorization notice processor 155 circulates, to at least one of predetermined terminals 152 belonging to the group, an authorization notice such as moving image data via a circulation route of authorization notice. The authorization notice contains a reference-only notice that involves no authorization.

The accessing for setting up a notice route, such as modifying the order of notice authorization, is performed only by the terminal 152. This management function is the one of the terminal 152 belonging to the group.

In response to the accessing from the terminal 152, the conversion processor 154 converts the format of the data, such as the video, stored in the storage device 146 into a designated format.

4. Structure of the Terminal

Figure 4:
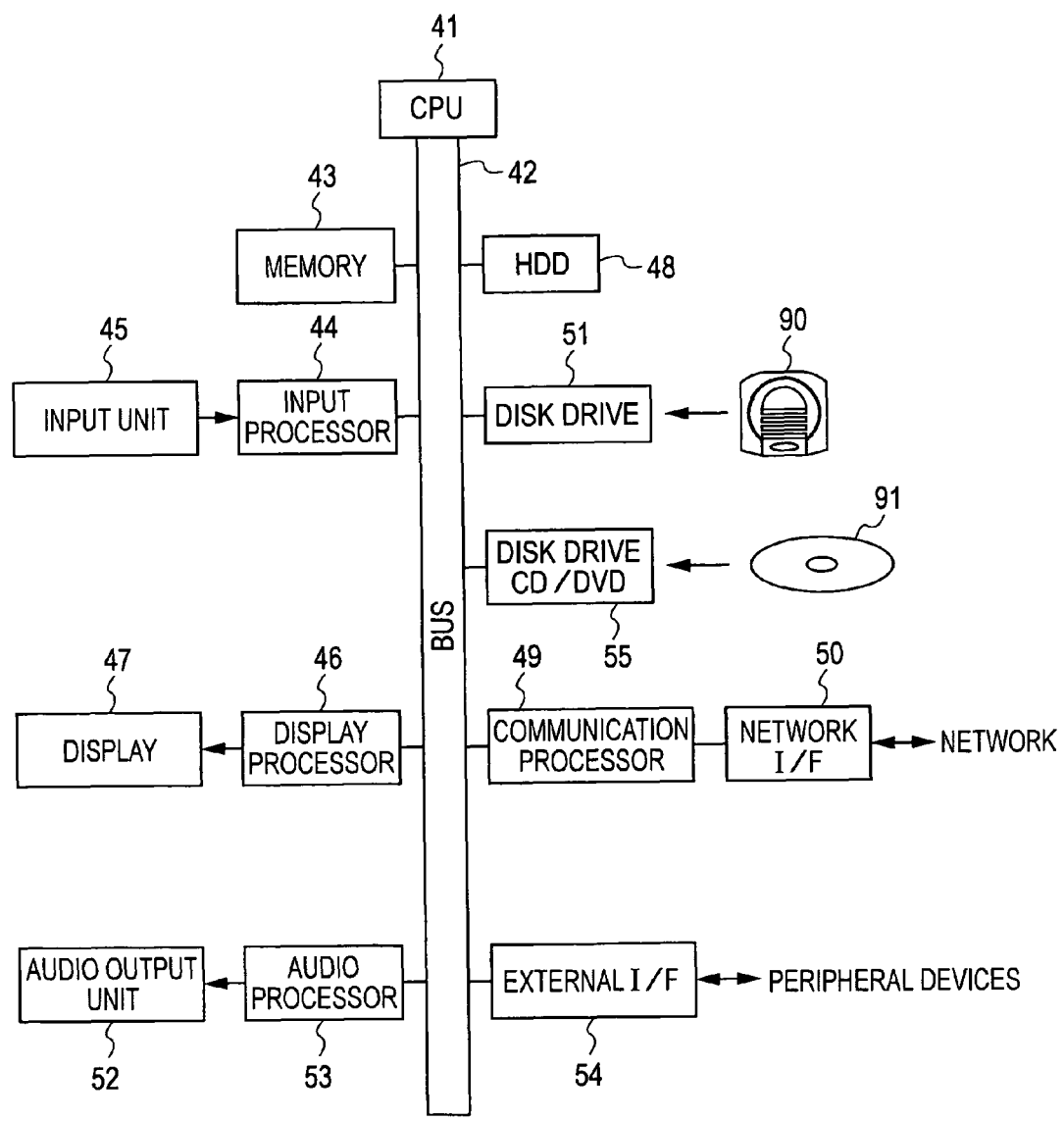
FIG. 4 is a block diagram of a terminal of the embodiment of the present invention.

FIG. 4 illustrates the structure of the terminal. The structure of the terminal is that of each of the information processing apparatuses 4, 5, 6, and the field PC 2 of FIG. 1.

For example, the terminal is realized by installing and initiating a program on a personal computer. The program allows the computer to view the composition table site and to input data to the composition table. Alternatively, a dedicated apparatus can be used instead of using a personal computer.

A CPU 41 of FIG. 4 performs control and arithmetic operations of elements under the control of the initiated program. For example, the CPU 41 performs an input and output operation of an operator, memory control, HDD (hard disk drive) control, a communication operation via a network, external interface control, recording and replay control of disks 90 and 91, and data arithmetic operations.

The CPU 41 exchanges control signals and data with circuit blocks via a bus 42.

A memory 43 collectively represents a RAM, a ROM, and a flash memory, used by the CPU 41.

The ROM of the memory 43 stores an operation program of the CPU 41, a program loader, etc. The flash memory of the memory 43 stores a variety of arithmetic coefficients, and parameters for use in the program. A data area and task area are temporarily reserved in the RAM of the memory 43 to execute the program.

An input unit 45 includes an input device such as a keyboard, a mouse, a touchpanel, a remote commander, a scanner, etc. The operator enters operational inputs and data using the input unit 45. An input processor 44 performs a predetermined process on input information, and transfers the processed input information to the CPU 41 as the operational input and data. In response, the CPU 41 performs required arithmetic operations and control on the input information.

A display 47 is a display device, such as a CRT or a liquid-crystal panel, and displays a variety of information screens to the operator.

When the CPU 41 supplies display information to the display processor 46 in accordance with a variety of operational statuses and input statuses, the display processor 46 causes the display 47 to execute a display operation based on the supplied display data.

An HDD 48 stores a variety of programs, various data, and serves as a data storage area for storing composition table data and a production schedule table.

The composition table data captured from the composition table site 3 can be recorded onto the HDD 48 under the control of the CPU 41.

Under the control of the CPU 41, a communication processor 49 performs a encode process on transmission data and a decode process on received data.

A network interface 50 transmits the transmission data encoded by a communication processor 49 to another device via the network 7. The network interface 50 transfers a signal transmitted from an external device via the network 7 to the communication processor 49.

The communication processor 49 transfers received information to the CPU 41.

The disk drive 51 records data onto and replays data from a disk 90. The disk 90 is used as a recording and replay medium in the image pickup device 1.

Under the control of the CPU 41, the disk drive 51 records, onto the loaded disk 90, the composition table data from the composition table site 3, for example. The disk drive 51 also plays a video, captured by the image pickup device 1 and recorded on the disk 90.

A disk drive 55 records data onto or replays data from a disk 91. The disk 91 can be a CD type disk such as a CD-DA, a CD-ROM, or a CD-R, or a DVD type disk such as a DVD-ROM, a DVD-RAM, or a DVD-R.

When a program for accessing the composition table site 3, or an application program for use in the job of each group, or data is supplied in a CD-ROM or a DVD-ROM, the disk 91 is loaded into the disk drive 55 to install the programs and data.

An external interface 54 is connected to an IEEE 1394, USB, or SCSI type peripheral device to perform data communication.

Devices corresponding to the disk drives 51 and 55 can be connected as the peripheral devices. An external HDD can be connected to store the programs and required databases thereon. Furthermore, a printer and a scanner can be connected as the peripheral devices. Together with another information processing apparatus, the terminal can form a LAN.

The audio processor 53 processes audio data, outputted to the operator, and supplies the processed audio data to an audio output unit 52, such as a loudspeaker or a headphone terminal as an audio output.

When the disk drives 51 and 55 read the audio data from the disks 90 and 91 respectively, the audio data can be outputted to the audio processor 53 and the audio output unit 52 as an audio output depending on the type of the audio processor 53 and audio output unit 52. An audio file stored in the HDD 48 or another element can be output for playing.

To use the information processing apparatuses including a personal computer as the terminal of the present invention, the program for causing the information processing apparatus of FIG. 4 to perform the following processes is installed onto the computer.

A process of accessing the composition table site 3 to acquire the composition table data.

A process of causing the display 47 or the like to display the acquired composition table data.

A process of recording the acquired composition table data onto the disk 90 or 91, the HDD 48, or the like.

A process of generating input information for a predetermined item in the composition table data from operation information and input data from the input unit 45 or the like, or data input via the external interface 54.

A process of transmitting (uploading) the generated input information to the composition table site 3 via the network interface 50.

When the composition table is viewed, it is not necessarily required that the terminal of each group view all content of the composition table data. A program executing a process for acquiring information of only a part of the items of the composition table data is also prepared in order to acquire the composition table data from the composition table site 3.

A program for generating the composition table data composed of items required for the production of the video program and transmitting (uploading) the composition table data to the composition table site 3 via the network interface 50 performs the function of the information processing apparatus 4 of the planning and composition group.

A program required to generate the input information to an item relating to one of the material gathering and production instruction in the composition table data is arranged in a process of generating the input information.

A program executing a process of generating the input information in an item relating to one of the material gathering and production in the composition table data is arranged in the terminal of the material gathering group, such as the field PC 2, or the information processing apparatus 5 of the production group.

A program executing a process of generating the input information in an item relating to one of a content of a video gathered or produced, and a content of an audio gathered or produced in the composition table data is arranged.

A program executing a process of generating the input information to an item relating to editing of the composition table data is arranged in the information processing apparatus 6 of the editing group.

These programs are supplied in the disk 91 or 90, and then installed onto the HDD 48. Furthermore, these programs can be downloaded from an external server via the network interface 50.

The programs can be stored in the HDD 48 or the memory 43 beforehand.

The programs can be stored in a peripheral device connected to the external interface 54.

5. Structure of the Image Pickup Device

FIG. 1 illustrates the image pickup device 1 of the system of FIG. 1 serving as terminals together with the field PC 2 for material gathering group.

A system controller 11 includes a microcomputer, and generally controls the image pickup device 1. More specifically, the system controller 11 controls operation of the following elements.

A camera section 12 is an assembly for video taking, and includes an image pickup unit 13, a video signal processor 14, and a camera controller 15.

The image pickup unit 13 includes a lens system composed an imaging lens, a diaphragm, etc., a drive system for causing the lens system to perform a focus operation and a zoom operation, and a CCD (Charge Coupled Device) that detects image bearing light by means of the lens system, and photoelectrically converts the detected light into an image signal.

The video signal processor 14 includes a sample-hold/AGC (Automatic Gain Control) circuit that gain adjusts a signal obtained by the CCD of the image pickup unit 13 and a video A/D converter, and generates digital video data of a captured image.

The camera controller 15 controls the operation of the image pickup unit 13 and the video signal processor 14 in response to an instruction from the system controller 11. The camera controller 15 performs a (motor) control process to cause the image pickup unit 13 to perform an auto-focus operation, an auto-exposure adjustment, a diaphragm adjustment, and a zoom adjustment.

The camera controller 15, including a timing generator, controls a signal processing operation of the CCD and the sample-hold/AGC circuit and the video A/D converter in the video signal processor 14 in accordance with a timing signal generated by the timing generator thereof.

The camera section 12 thus constructed generates the captured image data.

An audio signal processor 34 A/D converts an audio signal picked up by a microphone 33 into audio data that is synchronized with the captured image data.

A record and play section 16 records the image data (and the audio data picked up by the microphone 33), captured by the camera section 12, onto a recording medium (the disk 90) and plays the recorded image data.

The record and play section 16 includes an encoding and decoding unit 17, a disk drive 18, and a recording and playing controller 19.

The encoding and decoding unit 17 converts the image data, captured by the camera section 12, into a record format of the disk 90. The audio data is also converted in format. The video and audio data can be compressed in MPEG (Moving Picture Experts Group) method or another compression method before being recorded onto the disk 90.

The captured video data (and the audio data) processed by the encoding and decoding unit 17 is supplied to the disk drive 18 and then recorded onto the loaded disk 90.

During playing of the data on the disk 90, the video data (and the audio data) replayed by the disk drive 18 is decoded by the encoding and decoding unit 17.

In response to an instruction from the system controller 11, the recording and playing controller 19 controls the process of the encoding and decoding unit 17, the record and playing operation and data input and output operation of the disk drive 18.

The recording and playing controller 19 controls the disk drive 18, thereby reading and writing FAT (file allocation table) data, and editing the data recorded on the disk 90 to update the FAT.

The image data, captured by the camera section 12 during video taking, and the video data replayed from the disk 90 are displayed on a viewfinder 31.

When the camera section 12 outputs the captured image data during video taking or on standby for video taking, the captured video data is supplied to the viewfinder driver 30.

In response to an instruction from the system controller 11, the viewfinder driver 30 causes the viewfinder 31 to display a video of the captured video data. In response to an instruction from the system controller 11, the viewfinder driver 30 causes the viewfinder 31 to superimpose a character image on the video.

During replaying of the captured video data from the disk 90, the video data, played from the disk drive 18, and decoded by the encoding and decoding unit 17, is supplied to the viewfinder driver 30. In response to an instruction from the system controller 11, the viewfinder driver 30 causes the viewfinder 31 to display the supplied video data and the character image to be superimposed.

A photographer (cameraman) waits on standby for video taking (to check an object to be photographed), monitors video, checks the content of a video recorded on the disk 90, and performs a brief editing operation while viewing the viewfinder 31.

The audio data replayed from the disk 90 is D/A converted by an audio driver 35, and subjected to signal processing including a filtering operation and amplification, and the resulting processed signal is outputted from a loudspeaker 36.

An external interface 20 exchanges video data or the like with an audio-visual device, an information device, and a storage device, as external devices.

A communication unit 21 performs wired and wireless network communications. For example, the communication unit 21 includes a modem, an Ethernet interface, or a mobile telephone interface. With the communication unit 21, the image pickup device 1 can access the composition table site 3 via the network 7 as shown in FIG. 1.

The communication unit 21 may be internal to the image pickup device 1, or may be connected to the image pickup device 1 as a separate device. With the communication unit 21, the image pickup device 1 can perform network communications.

Within the material gathering group, the image pickup device 1 can perform a variety of data communications with the field PC 2 via the communication unit 21 or the external interface 20 in a wired or wireless fashion.

When the captured video and audio data is replayed by the record and play section 16, or during video taking (video recording), the captured video and audio data is transmitted via the communication unit 21 or the external interface 20.

Not only the original moving image but also low-resolution moving image compressed by the encoding and decoding unit is transmitted as the video data.

A ROM 22, a RAM 23, and a flash memory 24 store data and programs required by the system controller 11, and serve an arithmetic operation area.

For example, the ROM 22 stores a processing program of the system controller 11, and fixed data. The RAM 23 temporarily stores information and serves a work area. The flash memory 24 stores a variety of control coefficients.

To allow the image pickup device 1 to access the composition table site 3, the required program discussed with reference to the terminal of FIG. 4 is stored in the ROM 22 and the system controller 11 performs a process of the composition table in accordance with the program.

An operation unit 27 is provided with a variety of controls to operate the image pickup device 1. The controls are used to perform power operations, image pickup operations, replay operations, zoom operations, a variety of mode operations, and editing operations.

Upon detecting the operation of each control by a user, the system controller 11 controls elements to perform required functions.

A power supply 32 with a DC/DC converter thereof generates supply voltages at required levels for circuits in response to a direct current power from an internal battery or a direct current power obtained from a commercial alternating current power through a power supply adaptor. The system controller 11 controls the power supply 32 for power on/off in response to the power operation of the operation unit 27.

The image pickup device 1 can have a display such as a liquid-crystal display to display the composition table obtained from the composition table site 3.

Like the viewfinder 31, such a display can display a captured video and a replayed video.

The composition table data acquired from the composition table site 3 or the like can be stored in the RAM 23 or the flash memory 24. Alternatively, the record and play section 16 can record the composition table data on the disk 90 that records the video data and the audio data.

6. Composition Table

FIG. 6 illustrates the items prepared in the composition table.

As already discussed, the composition table, including a scene number and a cut number, is data in a table format into which information required for each of the jobs including material gathering, production, and editing, and information obtained as a result of the jobs are input.

As shown, scene information K1 contains columns for a scene number and a scene title. The scene information K1 means a scene structure of a video program determined in the planning and composition.

Cut information K2 contains columns for a cut number and a cut title. The cut is a unit of video forming one scene, and forms a continuous portion of video. A plurality of cuts typically form one scene.

Underlying planning intention K3 and video K4 contain a scenario and a description, and a still image, respectively.

Written in these items are the scenario of the scene and the cut, and the description of the intended content. Still image data is also inputted to convey a cut image of a moving video.

Material gathering and production instruction information K5 contains columns for a material gathering and production number, a location, a date and time of start, a date and time of end, a person in charge, equipment, an instruction mail transmission, and a progress status.

The "material gathering and production number" column is assigned to each cut.

The designation of a location where the material gathering and production are performed is written in the "location" column.

The designation of the date and time for the material gathering and production is written in the "date and time of start" column.

The designation of the date and time for completing the material gathering and destination is written in the "date and time of end" column.

The designation of a person in charge performing the material gathering and production is written in the "person in charge" column using an ID assigned to the person or staff in charge.

The designation of equipment for use in the material gathering and production is written the "equipment" column.

A instruction mail issued from the planning and composition group to a particular group in charge or a particular person in charge is written in the "instruction mail transmission" column, and an instruction mail is transmitted by clicking a transmission button attached to the "instruction mail transmission" column.

An instruction acknowledgement notification responsive to the instruction mail or progress information from each group are written in the "progress status" column.

Material gathering and production information K6 in the composition table contains columns of a medial ID, a recording session, a location, a date and time of start, a date and time of end, a person in charge, equipment, a note for material gathering and production, a copyright, and an edit OK mail.

Identification information of a medium (disk 90) on which the video data, captured by the image pickup device 1 as an instructed cut, is recorded is written in the "media ID" column.

A recording session of the video of the instructed cut is written in a frame ID of the video data or a time code in the "recording session" column.

If an IN point and an OUT point are designated within the recording session of the cut video in a brief editing process performed during the material gathering operation, information relating to the IN point and OUT point may be added to the "recording session" column. Alternatively, the "IN point" and "OUT point" for the brief editing process may be itemized within the material gathering and production information K6.

A location where the material gathering and production has been performed is written in the "location" column.

A date and time when the material gathering and production started are written in the "date and time of start" column.

A date and time when the material gathering and production completed are written in the "date and time of end" column.

A person in charge who made the material gathering and production is written in the "person in charge" column using an ID attached to the person or staff in charge.

Equipment used in the material gathering and production is written in the "equipment" column.

A note of which a group in charge and the other groups need to be aware is written in the "note for material gathering and production" column. The note includes a massage about the captured or produced video or the captured or produced audio, and information about an event that occurred in the material gathering and production job.

Information, relating to a copyright created in the material gathering and production or a copyright of an object on which the material gathering and production operation has been performed, is written in the "copyright" column.

A notice notifying of edit OK is input to the "edit OK mail" column. For example, the material gathering group or the production group completes the material gathering and production process, and completes the required inputting of information to the composition table. Then, the material gathering group or the production group writes a message for the editing group to permit the editing group to start the editing process. By clicking a transmission button attached to the "edit OK mail" column, the notice mail is transmitted.

The composition table contains items of information relating to the video K7, the audio K8, and the gathered data K9, captured or produced in the material gathering and production process.

The video K7 includes columns for a still image, a low-resolution moving image, an original moving image, and a UMID (Unique Material ID), and time.

The UMID is a unique worldwide ID (identification) identifying the material (including the audio data, the video data, etc.). It is not necessary to record the material identified by the UMID on a recording medium having the UMID recorded thereon. An external reference (linking to another medium) is possible.

A still image as a representative image of the captured cut is inputted to the "still image" column.

Low-resolution video data as captured cut video data is inputted to the "low-resolution moving image" column.

The captured cut video data is inputted to the "original moving image" column.

The UMID, namely, identification information attached to each video material (cut video) is written in the "UMID" column.

A time length of the video data is written in the "time" column.

The audio K8 contains a column of each channel. For example, the video data of four channels is inputted to the "CH1"-"CH4" columns, respectively.

The material gathering data K9 contains columns for a camera posture, camera parameters, and an environment.

A posture, a position, and a photographing direction of a camera during video taking are written in the "camera posture" column.

Numerical information of the image pickup device 1, such as a diaphragm, white balance, gain, etc., is written in the "camera parameters" column.

Information relating to the video taking environment is written in the "environment" column.

The composition table further contains items for an edited video K10, an edited audio K11, and edit data K12.

The edited video K10 contains columns for a still image, a low-resolution moving image, a high-resolution moving image, a UMID, and time.

An edited still image as a representative cut image is inputted to the "still image" column.

Low-quality video data as edited cut video data is inputted to the "low-resolution moving image" column.

Captured cut video data is inputted to the "high-resolution moving image" column.

The UMID, namely, identification information attached to an image material (cut video) is written in the "UMID" column.

A time length of edited video data is written in the "time" column.

The edited audio K11 contains a column of each channel. For example, the edited video data of four channels is inputted to the "CH1"-"CH4" columns, respectively.

The edit data K12 contains columns for edit effects, a superimpose, and a note.

Data such as a video effect added in an editing process is inputted to the "edit effect" column.

Superimpose information added in the editing process is inputted to the "superimpose" column.

A note of which a group in charge and the other groups need to be aware is written in the "note for material gathering and production" column. The note includes a massage and a notice about the edited video or the edited audio, and information about an event that occurred in the editing job.

The composition table data contains neither actual video data nor audio data in the "low-resolution moving image", the "original moving image", "CH1"-"CH4" in columns (K7, K8, K10, and K11) relating to the material gathering and production process and the editing process. As previously discussed with reference to FIG. 1, the video data and the audio data are stored in the compressed video database 3c and the video and music database 3d. The composition table data thus bears link information concerning these pieces of data. The link information is the UMID, for example.

A replay button is arranged for each item. In each terminal, the linked video data and audio data are replayed by clicking the replay button.

The actual video data and audio data are not inputted to the composition table data here. Alternatively, the actual video data and audio data, rather than the link information, may be inputted to the composition table data.

The composition table includes the above-referenced items. The planning and composition group produces the composition table data containing the above-referenced items for web posting (G3) of FIG. 2, and uploads the composition table data to the composition table site 3.

As previously discussed, the planning and composition group produces the production schedule table together with the above-referenced composition table data, and transmits the production schedule table and the composition table together to the composition table site 3 for viewing.

The production schedule table is data arranged in a table format shown in FIG. 7.

Before the production of the composition table, the production schedule table lists a writing schedule of a concept sheet, a concept sheet draft, posting schedule of posting the composition table data to the composition table site 3, and a material gathering and production schedule of cuts with the cut numbers thereof listed in the composition table.

The production schedule table is posted on the composition table site 3. Each group carries out the job thereof in accordance with the production schedule table. When a group in charge completes the job thereof listed in the production schedule table, the group enters information, such as the word "completed" in the production schedule table.

The production schedule table may be linked to the composition table data so that information about the completion of each job is automatically inputted in response to the inputting of predetermined data into the composition table. For example, if a captured video having a cut #001 is inputted to the composition table, information of the cut #001 in the production schedule table is changed to "completed".

The composition table and the production schedule table have been discussed. Each group views the content of each item in accordance with the job in the group's charge, and inputs information to the tables.

FIG. 8 illustrates which group views and inputs information to which item in the composition table. FIG. 8 lists a viewing (○) operation and an inputting (●) operation to each item performed by the planning and composition group (information processing apparatus 4), the field PC 2 of the material gathering group, the image pickup device 1 of the material gathering group, the production group (information processing apparatus 5), and the editing group (information processing apparatus 6).

As shown in the top portion of the table in FIG. 8, the items (scene number through equipment) of the scene K1, the cut K2, the planning intention K3, the video K4, and the material gathering and production intention K5 are instructions issued from the planning and composition group to each group.

The information processing apparatus 4 of the planning and composition group inputs the content of each of these items. The terminals (1, 2, 5, and 6) views the contents of these items to check the content of job instructions.

The image pickup device 1 does not view the columns of the "scenario", the "description", and the "still image" here. It is sufficient if theses columns are viewed by the field PC 2 in a material gathering field, and occasionally, it is not appropriate to download a relatively large amount of information to the image pickup device 1. Alternatively, the image pickup device 1 can view the these columns.

The "instruction mail transmission" information in the material gathering and production instruction K5 is issued from the planning and composition group to each group as discussed previously. The "instruction mail transmission" information is thus inputted by the information processing apparatus 4 of the planning and composition group. The terminal of each destination group displays the content as a received mail. The "progress status" is for a mail reception acknowledgement notification and a status notification, and the terminal of each group automatically or manually inputs data to the "progress status" column. The planning and composition group views the "progress status", and checks mailed instruction notifications and the job progress status of each group.

The items (media ID—environment) in the material gathering and production information K6, the video K7, the audio K8, and the material gathering data K9 shown in the middle portion of the table of FIG. 8 are inputted by the material gathering group and the production group.

The image pickup device 1 inputs information responsive to video taking to the "medial ID", the "recording session", the "location", the "date and time of start", the "date and time of end", the "person in charge", and the "equipment". The "note for the material gathering and production" and the "copyright" are inputted not by the image pickup device 1 but by the field PC 2.

The video and audio data obtained in the real video taking (the "low-resolution moving image", the "original moving image", the "UMID", the "time", the "CH1"-"CH4") and the posture, the parameters, and the video taking environment as the "camera posture", the "camera parameters", and the "environment" are inputted to the items in the video K7, the audio K8, and the data K9.

The "still image" is selected and inputted by the field PC 2 based on the "low-resolution moving image" rather than by the image pickup device 1.

The field PC 2 inputs information responsive to the actual video taking onto the "location", the "date and time of start", the "date and time of end", the "person in charge", the "equipment", the "note for the material gathering and production", and the "copyright".

The "still image" is inputted to the video K7.

The image pickup device 1 inputs the "media ID", and the "recording session" while the field PC 2 views these pieces of information. Although the image pickup device 1 inputs the "environment", the field PC 2 also can input the "environment".

The field PC 2 views the video and audio (the "low-resolution moving image", the "UMID", the "time", the "CH1"-"CH4") captured by the image pickup device 1, and the "camera posture", and the "camera parameters". The field PC 2 generates the "still image" based on the "low-resolution moving image" and inputs the resulting "still image".

The "edit OK mail" is inputted when the material gathering group (the field PC and the image pickup device) and the production group complete required jobs in a material gathering phase and a production phase.

Information, inputted by the image pickup device 1 and viewed on the field PC 2, is directly transferred from the image pickup device 1 to the field PC 2 rather than via the composition table site 3. For this reason, the original moving image cannot be viewed on the field PC 2. This is because communication of moving image in a large amount of data between the image pickup device 1 and the field PC 2 in the same material gathering field is not appropriate.

The image pickup device 1 and the field PC 2 can mutually view each other's input information via the composition table site 3. The field PC 2 can view the "original moving image" transmitted to the composition table site 3 from the image pickup device 1.

The production group inputs all items in the middle portion of the table of FIG. 8, except the "camera posture", the "camera parameters", and the "environment" relating to the image pickup device 1.

The items (still image—note) of the edited video K10, the edited video K11, and the edit data K12 shown in the middle portion of the table of FIG. 8 are inputted by the editing group.

The planning and composition group and the production group view and check the items inputted by the editing group, and perform required jobs.

The items in the composition table and the input and view items of each group have been described for exemplary purposes only.

7. Function of Each Element

The functions of elements that produce the video program using the composition table are discussed below.

<Function of the Composition Table Site 3>

The composition table site 3 retrieves all information inputted to the composition table and the production schedule table from the databases. The above-referenced instruction information, the video, the audio, the material gathering information, the material gathering intention, the scenario, the schedule and other instruction information are retrieved.

The composition table site 3 can display major items as the composition table.

The composition table site 3 can display only required information. For example, the composition table site 3 displays items required or items accessible, based on the type of a terminal attempting to access, the type of a group, or the authority of a person in charge.

The composition table site 3 inserts or deletes a scene or a cut. In response to an instruction from the planning and composition group, the frame of the composition table is modified.

The composition table site 3 links the production schedule table to the composition table. For example, an automatic inputting process is performed to the production schedule table in response to the inputting of a predetermined item to the composition table.

The composition table site 3 stores a modification history. For example, if a scene is inserted, information about the content of a modification, the date and time of the modification, and a person who modified, such as "scene insertion (2002/1/5 10:35 by Ichiro SUZUKI)", is stored.

The composition table site 3 stores the moving image in the video and music database 3d as a dedicated server, and manages the moving image in the composition table by means of linking function. The composition table site 3 stores the low-resolution moving image in the dedicated compressed video database 3c while also establishing a link with the composition table.

The composition table site 3 selects a cell in the composition table for the audio data, and a replay button attached to the table is clicked for replaying. The video/audio captured or edited is replayed from the composition table.

The composition table site 3 transmits an instruction mail to each group based on the utilization of each item in the "instruction mail transmission" of the planning and composition group, and stores the history of the mail transmission. The instruction mail is transmitted to a personal computer and a mobile telephone. Communication results are accounted for in the "progress" in the composition table. When a receiver sends a reply for acknowledgement in a mail acknowledgement function, a message meaning an instruction has been accepted is displayed in the "progress" column.

In response to the inputting to the composition table, the message that the instruction has been accepted is displayed.

The composition table site 3 transmits an instruction mail to the editing group and stores the history of the transmission of the instruction mail when the material gathering group and the production group use the "edit OK mail" item. The instruction mail is transmitted to a personal computer and a mobile telephone.

The composition table site 3 manages paper work required for the material gathering, such as a necessity of an application, application destination information, a progress of the application, permit cards in material gathering permission management function. For example, these items can be posted in the composition table, although not mentioned in the above discussion.

The composition table site 3 manages a necessity of a copyright permission request, copyright holder information, a progress of a copyright permission, document viewing, rebroadcast information, etc. These items can also be posted in the composition table.

In a viewer access management, the composition table site 3 manages an item range within which each group or each person in charge is permitted to access the composition table. The composition table site 3 manages the composition table to prevent any group or any person other than a predetermined group or a predetermined person in charge from accessing the composition table.

The composition table site 3 has a multi-layer structure with a layer for production and direction purposes, a layer for material gathering, etc. When these layers are all accumulated, the entirety of the composition table is completed. The view items and the input items are accessible to some groups while being inaccessible to other groups. View and input items are displayed to only groups that are permitted to access those view and input items.

When the composition table site 3 is multi-layer structured, update (information input) authority is set from layer to layer.

Instructions relating to the editing, such as superimposing and effects instructions, can be issued.

The composition table site 3 is linked to a complete packet. Data edited and uploaded to the composition table is linked as complete packet storage data.

<Function of the Image Pickup Device 1>

With a communication function, the image pickup device 1 accesses the composition table site 3, and performs data communication with the field PC 2.

With the communication function, the image pickup device 1 receives data from the composition table site 3. The image pickup device 1 has a high degree of freedom in setting the view items in the composition table.

With the communication function, the image pickup device 1 receives data from the field PC 2. The image pickup device 1 has a high degree of freedom in setting data items to be received.

With the communication function, the image pickup device 1 transmits data to the composition table site 3. The image pickup device 1 has a high degree of freedom in setting the input items in the composition table.

With the communication function, the image pickup device 1 transmits data to the field PC 2. The image pickup device 1 has a high degree of freedom in setting data items to be transmitted to the field PC 2.

A low-resolution moving image, a time code, and a UMID, being captured for the production of hard news, are transmitted to the composition table site 3 and the field PC 2 at the same time.

As for recording of captured image data, a UMID, a shot mark, and shot data are recorded. The shot marks include record start point, a record end point, OK·NG information. The shot data includes date, time, and apparatus ID.

A camera status (camera position data), camera parameters (diaphragm, white balance, gain, etc.) are recorded.

All frames of the video data are tagged with a marker (frame ID). The frame ID is attached to facilitate searching, and is different from the UMID.

The image pickup device 1 records and manages a correspondence between a UMID and a frame ID on an FAT area of the disk 90 every shot and every predetermined interval time.

The composition table in whole or in part can be recorded.

The image pickup device 1 provides multi-language capability.

The disk 90 in use has a pre-recorded media ID.

The composition table recorded on a medium (disk 90 or the like) is displayed on the viewfinder 31 or the like, and the content of the record is accessible.

The composition table recorded on the medium (disk 90 or the like) has partially the same format as the composition table of the composition table site 3.

The composition table data recorded on the medium (disk 90 or the like) can be added to, and used to modify (overwrite) the composition table in the composition table site 3.

The data overwriting the composition table includes an original image, a low-resolution image, audio, and meta data.

The display of the composition table can be rearranged in order, and it is not necessary to take video in the instructed order of scenes or cuts.

<Functions of the Field PC 2, and the Information Processing Apparatuses 4, 5, and 6>

A web browser performs a basic operation on the composition table.

Each of the field PC 2, and the information processing apparatuses 4, 5, and 6 can input data to and manipulate the composition table in a log-on state. To quickly perform a detailed operation, the composition table data is downloaded for manipulation using applications. By uploading the manipulated composition table site 3, the composition table data on the composition table site 3 is also manipulated (updated) in the same manner.

Data relating to an item of an instruction content in the composition table can be inputted (by the information processing apparatus 4).

The inputting of material gathering information, production information, and edit information to the composition table (the field PC 2, and the information processing apparatuses 5 and 6) is possible.

8. Example of Access to the Composition Table

The operation of the image pickup device 1 and the field PC 2 in the use of the composition table is described below.

FIG. 9 illustrates the communication operation among the composition table site 3, the image pickup device 1, and the field PC 2.

<The Field PC 2 and the Composition Table Site 3>

By accessing the composition table site 3, the field PC 2 acquires the composition table. By viewing the item of the material gathering instruction in the composition table, the field PC 2 inputs a variety of information in accordance with material gathering activities. In this case, the information is inputted to the composition table in a log-on state on the composition table site 3. Alternatively, the field PC 2 downloads the composition table for manipulation, and then uploads the modified the composition table to the composition table site 3. An operator can select which way to use to input the information to the composition table.

<The Image Pickup Device 1 and the Composition Table Site 3>

The image pickup device 1 acquires the composition table by accessing the composition table site 3. In this case, the image pickup device 1 acquires only a part of the composition table items accessible to the material gathering group. This is because the field PC 2 can access all composition table items accessible to the material gathering group.

The composition table data is captured into the image pickup device 1 via the communication unit 21. The composition table data is then recorded on the disk 90, and is optionally inputted and displayed on the image pickup device 1.

A video taking cameraman using the image pickup device 1 checks the material gathering instruction on one of the image pickup device 1 and the field PC 2, and performs a required video taking operation.

The video taking operation is performed with a cut posted on the composition table selected.

With the image pickup device 1 capturing video, the video data and the audio data are recorded on the disk 90 loaded in the image pickup device 1. Compressed video data is also recorded on the disk 90. These pieces of data are linked to the columns of the composition table corresponding to the cut selected during the video taking operation (the "original moving image", the "low-resolution moving image", the "CH1"-the "CH4").

The UMID, the time code, the frame ID, and other meta data are also recorded on the disk 90, and are accounted for on the composition table data. For example, these pieces of data are inputted to the respective items of the "UMID", the "recording session", the "time", and the "camera parameters".

The information of the media ID, the location, the date and time, the person in charge, the equipment, etc. written on the disk 90 as the material gathering and production information K6 are inputted to the composition table data.

The video and audio data obtained in the video taking and the data inputted to the composition table on the disk 90 are transmitted to the composition table site 3 via the communication unit 21. The video and audio data are thus inputted to the items of the material gathering information and the material gathering content of the composition table site 3. For example, the material gathering content items include the "media ID" and other material gathering information, the "original moving image", the "low-resolution moving image", the "UMID", the "CH1"-the "CH4".

Depending on the communication performance and the communication environment of the image pickup device 1 and a line in use, the transmission of the video data, such as the "original moving image" and the "low-resolution moving image" and the music data is not appropriate. In such a case, at least the UMID is transmitted.

If the UMID is inputted to a certain cut in the composition table of the composition table site 3, linking is established when the actual video data is uploaded.

<The Image Pickup Device 1 and the Field PC 2>

The image pickup device 1 transmits the low-resolution moving image, the UMID, the image pickup information of the captured image to the field PC 2.

The field PC 2 transmits a part of the composition table (the material gathering instruction manipulated in the field) to the image pickup device 1 as necessary.

9. Production Job Using the Composition Table

An example of the video program production job performed based on the structure and the functions of each devices and the content of the composition table is described below.

<Conception Phase (the Planning and Composition Group: the Information Processing Apparatus 4)>

After producing the composition table containing required items, a scene number, a scene title, a cut number, a cut title, a scenario, and a description are inputted to items of the scene K1, the cut K2, the planning intention K3, and the video K4 of FIG. 10.

A hand-written sketch (so-called storyboard) or a still image captured by a digital camera or the like is inputted to the item of the still image.

The inputting of these data is performed on a per scene number basis. For example, even if data is inputted to each item for scene 1 with scene 2 and subsequent scenes left unfilled, the material gathering and production can proceed to the planning phase thereof.

<The Planning Phase of the Material Gathering and Production
(The Planning and Composition Group: the Information Processing Apparatus 4)>

A material gathering and production number, a location, a date and time of start, a date and time of end, a person in charge (a name of the person in charge and an ID of the person in charge), and equipment are inputted to the respective items of the material gathering and production instruction K5 of the composition table of FIG. 10.

The writing of these data can be performed on a per scene number basis. For example, even if data is inputted to each item for scene 1 with scene 2 and subsequent scenes left unfilled, the process can proceed to the next material gathering and production activity.

An instruction mail is transmitted as necessary. To transmit the instruction mail, a transmission button arranged in an instruction mail transmission column is pressed.

A production schedule table is produced while the composition table is created and the data is inputted to the items of the composition table.

The progress column shows information from each group relating to the material gathering and production to be discussed below.

<The Material Gathering Activity (the Material Gathering Group: the Image Pickup Device 1, and the Field PC 2)>

The image pickup device 1 and the field PC 2 acquire the composition table having the items of FIGS. 11 and 12. The material gathering activity is performed referring to the already posted information of the scene K1, the cut K2, the planning intention K3, the video K4, and the material gathering and production instruction K5.

A media ID, a recording session, a location, a date and time, a date and time, a person in charge (+ID), equipment, and a material gathering note are written on the items of the information processing apparatus 6 of FIG. 11.

If an object is copyrighted, a notice is written on the copyright column.

The progress status of the material gathering activity is written on the progress column. The wording written on the program status column includes the instruction accepted, the material gathering process in progress, the material gathering process completed, etc.

The results of the material gathering activity are inputted to the items of the video K7, the audio K8, and the material gathering data K9 as shown in FIG. 12.

The writing to the items of FIGS. 11 and 12 are performed on a per scene number basis. For example, if the material gathering activity is performed for scene 1 only, and information is written in each item, the next editing process is performed even if scene 2 and subsequent scenes are left unfilled.

<The Production Activity (the Production Group: the Information Processing Apparatus 5)>

The information processing apparatus 5 acquires the composition table data having the items of FIGS. 11 and 12. The information processing apparatus 5 checks the information of the already posted items in the scene K1, the cut K2, the planning intention K3, the video K4, and the material gathering and production instruction K5, and the production group performs the production activity.

A media ID, a recording session, a location, a date and time of start, a date and time of end, a person in charge (+ID), equipment, and a material gathering note are written in the items of the material gathering and production information K6 of FIG. 11.

If the video and audio data produced and selected is copyrighted, a notice is written in the copyright column.

The progress status of the production activity is written in the progress column. The wording written in the progress column includes the instruction accepted, the production process in progress, the production process completed, etc.

The results of the production activity are inputted to the items of the video K7, the audio K8, and the material gathering data K9 of FIG. 12.

The writing to the items of FIGS. 11 and 12 is performed on a per scene number basis. For example, even if the material gathering activity is performed for scene 1 only and the resulting information is inputted to each item with scene 2 and subsequent scenes left unfilled, and the process can proceed to the editing activity for scene 1.

<The Editing Activity (the Editing Group: the Information Processing Apparatus 6)>

The information processing apparatus 6 acquires the composition table data having the items of FIG. 13. The editing group performs the editing activity after checking the already posted information in the items of the scene K1, the cut K2, and the planning intention K3. The editing process is performed using the video and audio already inputted by the material gathering group and the production group as the items of the composition table of FIGS. 11 and 12.

The video and audio as the editing results are inputted to the items of the edited video K10, and the edited video K11. The composition table itself cannot be edited, but the results are linked. More specifically, link information of the edited video and audio data is written.

A link is established with the edit effects (such as wiping in screen transition) and superimposing in the items of the edit data K12.

Information is inputted to the editing note.

The progress status of the editing activity is written in the progress column. The wording written in the progress column includes the editing process in progress, the editing completed, etc.

Each group performs the instructed job thereof, referencing the composition table data, and accounts for the job results in the composition table.

Each group views the composition table to learn the job statuses of the other groups, and starts any job ready to start on a per scene unit. The job is thus flexibly and smoothly performed.

Since the video and audio data captured and produced, and the edited video and audio data are linked to the composition table, any group in need checks the content of the video at any time. Under the production direction of the planning and composition group, the video is checked and a raw video is smoothly checked during the editing process of the editing group.

When the material gathering and production of all scenes are complete, the content of the captured and produced video data is arranged in the composition table in the order planned at the concept phase. The editing group simply performs a slight adjustment on the scenes and the cuts, and performs a finishing process on the entire video program. The jobs are thus efficiently performed.

The composition table is accessed by each group, and data is input at any time.

It is required that the content of the composition table be continuously updated to each group, and that the updating of the items in the content of the composition table covered by each group be facilitated.

As for the data inputting, the range of inputting (for modification and addition) performed by each group or a person in charge is limited depending on the content of the job of each group and the range of authority of each group.

For example, one of a material gathering ID and a production ID identifies input-enabled items, and both a person-in-charge ID and a password identify input-enabled items. Since the input-enabled items are set to be different from person to person, confusion of information in the composition table data is avoided. Information is thus inputted by a person having a right authority.

The material gathering ID, the production ID, and the person-in-charge ID need to be unique in the usage of the system.

To keep the content of the composition table updated to each group, the following synchronization process is performed.

An input operation to the composition table is performed by inputting one of the material gathering ID and the production ID or both the person-in-charge ID and the password and by issuing an execution command. In principle, the content of the data in the material gathering and production field is automatically kept identical to the content of the data in the composition table site 3. When data is inputted to the composition table in the terminal at a given group, the same data is inputted to the composition table site 3. When the terminal of another group accesses and views the composition table site 3 immediately subsequent to the data inputting, the composition table in the updated state thereof is viewed.

During the same material gathering and production, the composition table needs frequently partially modifying. The range of items for performing the synchronization process prior to the issue of the execution command can be selectively set.

10. Process Example

The production process using the composition table is performed based on the composition table and the functions of the elements. The specific process of the elements in the production job is described below.

Figure 14:
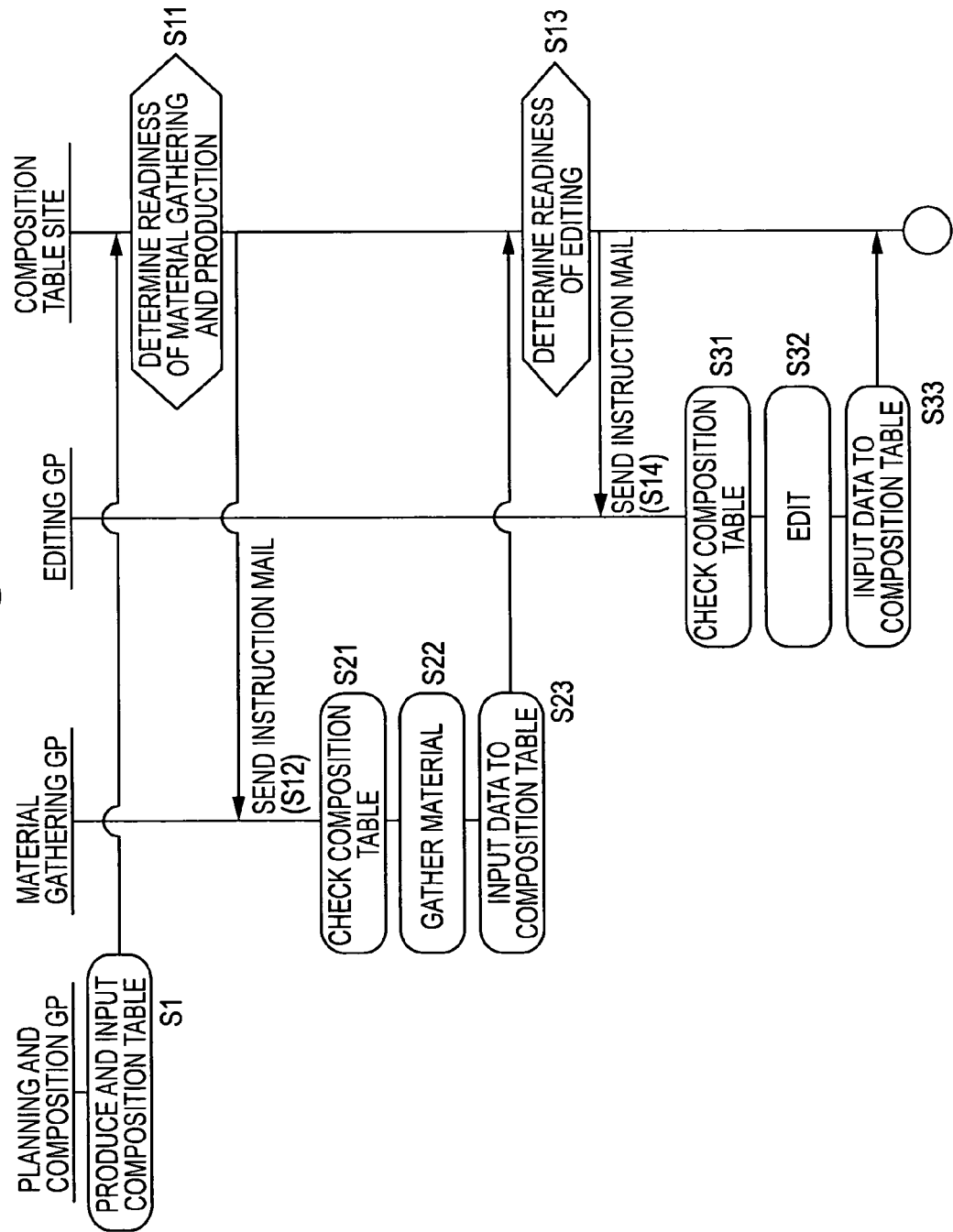
FIG. 14 illustrates a process flow in accordance with the embodiment of the present invention.

FIG. 14 diagrammatically illustrates the process flow of each group in a series of production job steps. FIGS. 15-20 specifically illustrate the processes of the groups.

As shown in FIG. 14, the production group performs the process substantially identical to that of the material gathering group (the words "material gathering" is simply replaced with the word "production"), and the figure and the discussion thereof are omitted herein.

The entire flow of the process of FIG. 14 is described in time sequence as below.

Step S1: The planning and composition group produces the composition table, and inputs data to required items. The produced composition table in the composition table site accounts for the intention of the planning and composition group in the content thereof.

Step S11: The composition table site determines the readiness of the material gathering and production based on a determination of whether the planning and composition group has inputted an "instruction image transmission".

Step S12: The composition table site transmits an instruction mail to the material gathering group and the production group in response to the input of the "instruction mail transmission" onto the composition table.

Step S21: The material gathering group views the composition table in response to the reception of the instruction mail and checks the content of the material gathering.

Step S22: The material gathering group performs the material gathering process in accordance with the content written on the viewed composition table (the production group produces video, music, the audio, and other data).

Step S23: Data is inputted to the composition table in accordance with the material gathering (production). The results of the material gathering (production) are thus accounted for in the composition table.

Step S13: The composition table site determines the readiness of the editing based on a determination of whether an "edit OK mail" has been inputted by the material gathering group and the production group.

Step S14: The composition table site transmits an instruction mail to the editing group in response to the reception of the "edit OK mail" in the composition table from each of the groups performing pre-edit jobs, such as the material gathering group and the production group.

Step S31: The editing group views the composition table in response to the received instruction mail, and checks results of the material gathering and production and objective of the editing.

Step S32: The editing process is performed in accordance with the composition table.

Step S33: Information is inputted to the composition table in accordance with the editing process. The editing results are thus accounted for in the composition table, and the video program is completed.

Figure 15:
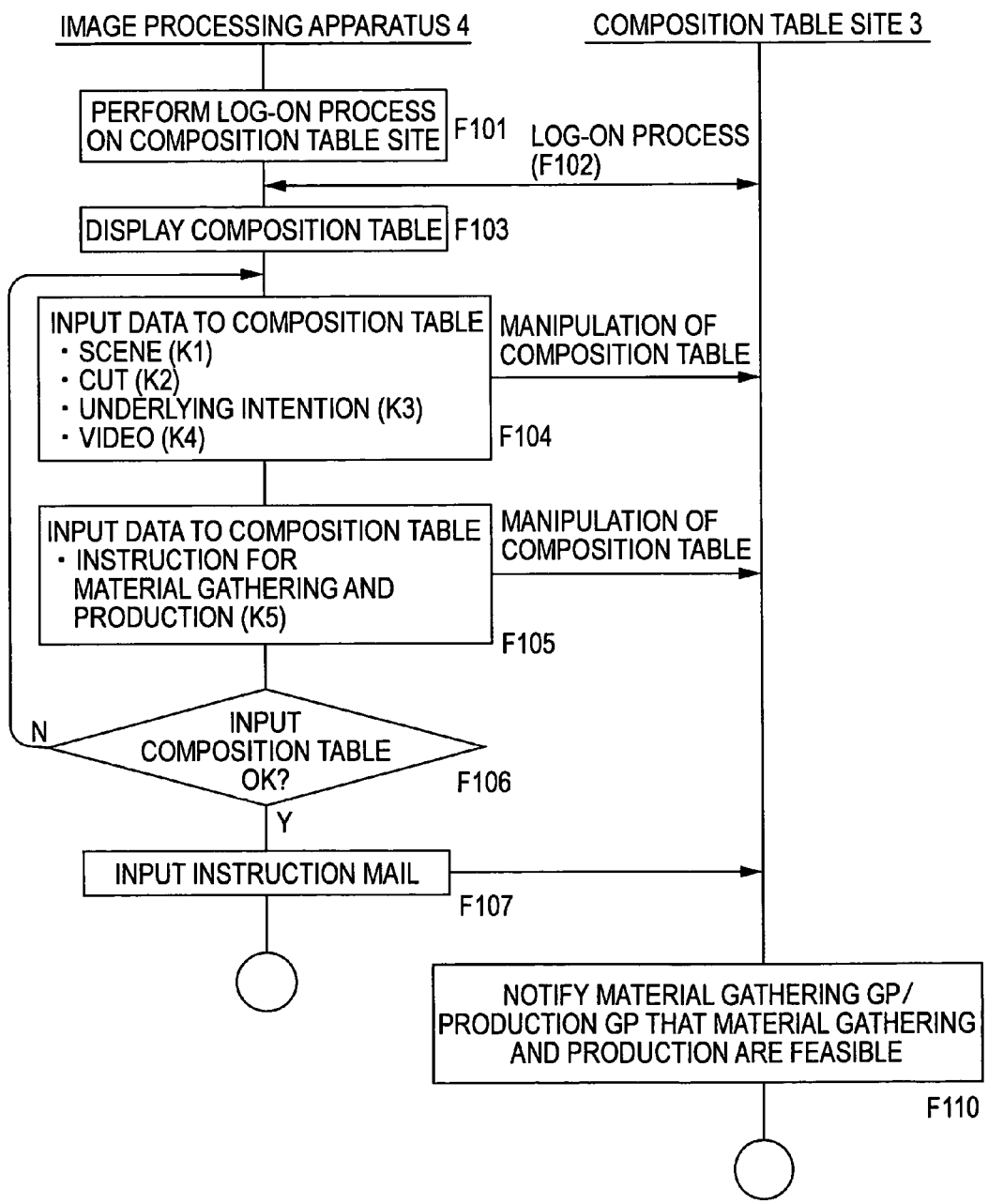
FIG. 15 is a flowchart of a planning and composition process in accordance with the embodiment of the present invention.

In the process flow of FIG. 14, the process in step S1 performed by the information processing apparatus 4 of the planning and composition group is described below together with the process of the composition table site 3 with reference to FIG. 15.

The information processing apparatus 4 of the planning and composition group performs a log-on process to the composition table site 3 in step F101 to input data to the composition table, and establishes a log-on state with the composition table site 3 in step F102.

In step F103, the display 47 of the information processing apparatus 4 displays the composition table, and the data inputting to the composition table (the manipulation of the composition table) is performed in steps F104 and F105.

In step S104, the information processing apparatus 4 performs the input process to the items of the scene K1, the cut K2, the planning intention K3, and the video K4. With the input process performed in the log-on state, the composition table uploaded to the composition table site 3 is manipulated.

In step F105, the input process is performed to the items of the material gathering and production instruction K5. With the input process performed on these items in the log-on state, the composition table uploaded to the composition table site 3 is manipulated.

The input process in steps F104 and F105 continues until a person in charge inputs an operational input acknowledging the completion of the input process to the required items in step F106.

When the input process to the required items is complete, the information processing apparatus 4 proceeds to an instruction mail input process in step F107. The person in charge inputs required comments in the item of the instruction mail transmission and transmits the instruction mail. The input items of the instruction mail transmission are accounted for in the composition table.

When the required process is complete, the information processing apparatus 4 performs a log-out process although a corresponding step is not shown.

The controller 3a of the composition table site 3 stores the composition table manipulated in response to the above-referenced input process by the information processing apparatus 4 to the composition table. Upon confirming that the instruction mail input is performed to the composition table in step F107, the controller 3a of the composition table site 3 transmits the instruction mail to the material gathering group and the production group in step F110 (steps S11 and S12 of FIG. 14).

Figure 16:
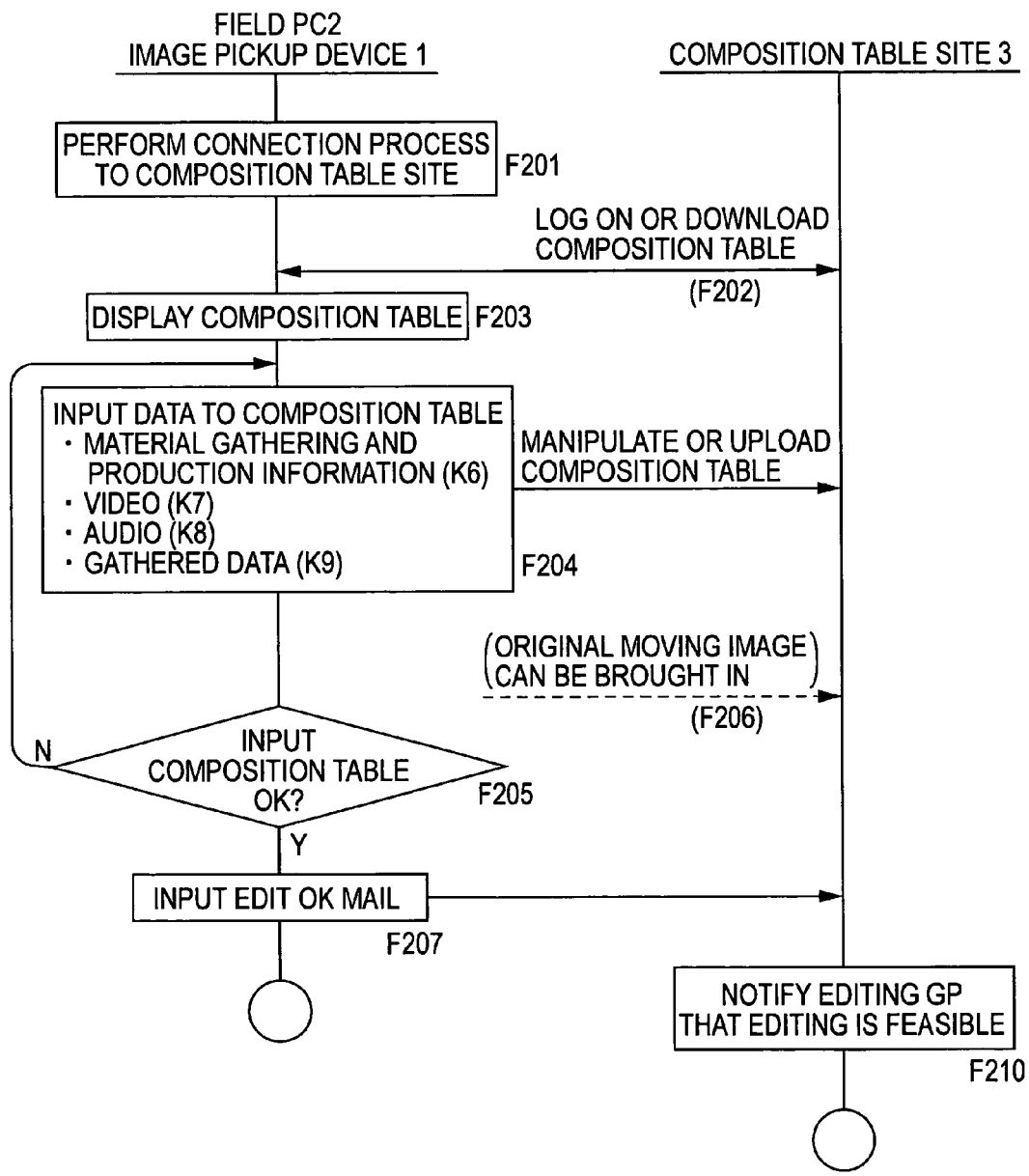
FIG. 16 is a flowchart of a material gathering process in accordance with the embodiment of the present invention.

FIG. 16 illustrates the input process to the composition table by the field PC 2 or the image pickup device 1 by the material gathering group, namely, the input process to the composition table in step S23 of FIG. 14. The input process of the information processing apparatus 5 of the production group to the composition table is substantially identical to the process of FIG. 16.

The process of FIG. 16 is the input process to the composition table subsequent to the completion of the material gathering. In this process, however, the image pickup device 1 can still input information to the composition table for material gathering and the field PC 2 can still input information to a brief editing item. These input steps will be discussed later.

In step F201, the field PC 2 (or the image pickup device 1) of the material gathering group connects to the composition table site 3 to input information to the composition table. In step F202, a log-on state is established with the composition table site 3 or the composition table data is downloaded from the composition table site 3.

The field PC 2 (or the image pickup device 1) displays the composition table in step F203 and performs the data inputting to the composition table (the manipulation of the composition table) in step F204.

In step F204, the data input process is performed to the items of the material gathering and production information K6, the video K7, the audio K8, and the material gathering data K9 of the composition table. With the input process performed to the items in the log-on state, the composition table uploaded to the composition table site 3 is manipulated. Alternatively, the data input process is performed to a downloaded composition table for the data input process, and then the resulting composition table is uploaded to the composition table site 3.

The link information is inputted to the composition table in connection with the video data and the audio data obtained in the actual material gathering process, and the video data and the audio data are uploaded to the composition table site 3 separately from the composition table. The low-resolution moving image, the still image, and the audio data can be directly inputted to the composition table and then uploaded.

It is perfectly acceptable to upload the original moving image data. In view of network environments, however, an original moving image can be personally brought in and handed over to the composition table site 3 (F206). For example, an original moving image recorded on a recording medium, such as the disk 90, is brought in to the composition table site 3 and then stored in the video and music database 3d.

The input process in step F204 continues until the person in charge inputs an operational input acknowledging the completion of the input process to the required items in step F205.

When an operation to end the input process of the required items is performed, the process of the field PC 2 (the image pickup device 1) proceeds to an edit OK mail process in step F207. The person in charge inputs required comments in the item of the edit OK instruction mail, and transmits a mail. The input data in the item of the instruction mail transmission is accounted for in the composition table.

The controller 3a of the composition table site 3 stores the composition table manipulated in response to the input process to the composition table by the field PC 2 (the image pickup device 1). Upon confirming in step F207 that the edit OK mail is inputted to the composition table, the controller 3a of the composition table site 3 proceeds to step F210 to transmit the instruction mail to the editing group (steps S13 and S14 of FIG. 14).

Figure 17:
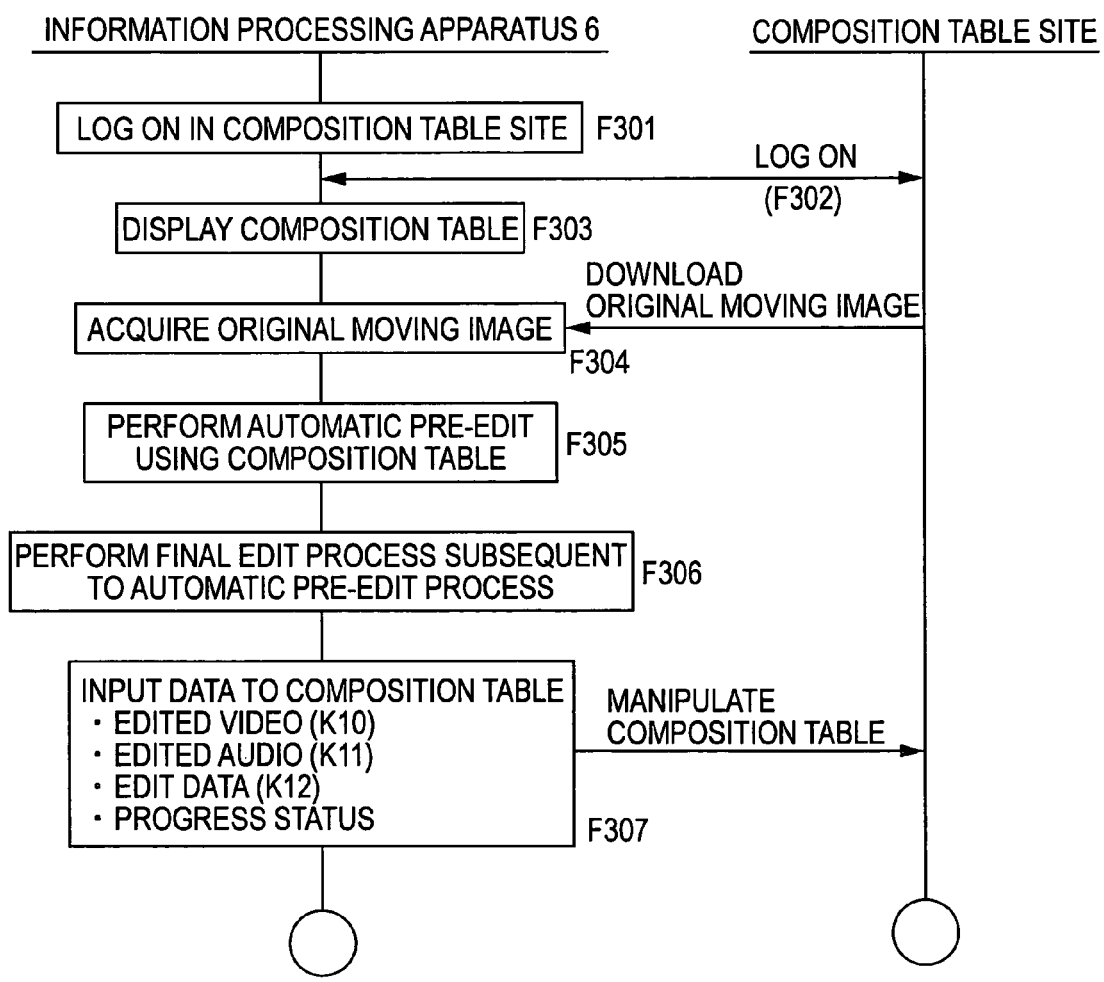
FIG. 17 is a flowchart of an editing process in accordance with the embodiment of the present invention.

FIG. 17 illustrates the process of the information processing apparatus 6 of the editing group, namely, the editing process and the input process to the composition table in steps S31-S33 of FIG. 14.

Upon learning from the instruction mail from the composition table site 3 that the editing process is ready, the information processing apparatus 6 of the editing group performs a log-on process to the composition table site 3 in step F301. In step F302, the information processing apparatus 6 establishes a log-on state with the composition table site 3. In step F303, the composition table is displayed.

In step F304, the information processing apparatus 6 downloads the original moving image, the low-resolution moving image, the audio data, etc. from the composition table site 3 based on the link information of the original moving image inputted to the composition table.

If the data rather than the link information is inputted to the composition table, the data downloading is not necessary.

In step F305, the information processing apparatus 6 performs an automatic brief editing process using the composition table. If the field PC 2 has inputted a IN point and an OUT point of each cut to the composition table, the editing process is performed based on these data.

In step F306, the information processing apparatus 6 performs a final editing process on the briefly edited data.

When the final editing process is complete, the information processing apparatus 6 performs the input process to the composition table (the manipulation of the composition table) in step F307.

In step F307, the data input process is performed to the items of the edited video K10, the edited video K11, and the edit data K12 of the composition table. With the input process performed to the items in the log-on state, the composition table uploaded to the composition table site 3 is manipulated.

A series of processes of FIG. 14 including the input process to the process of accounting for the edit results in the composition table by the planning and composition group has been discussed.

The input process to the composition table can be performed in steps S21 and S22 of FIG. 14 of the material gathering group.

Figure 18:
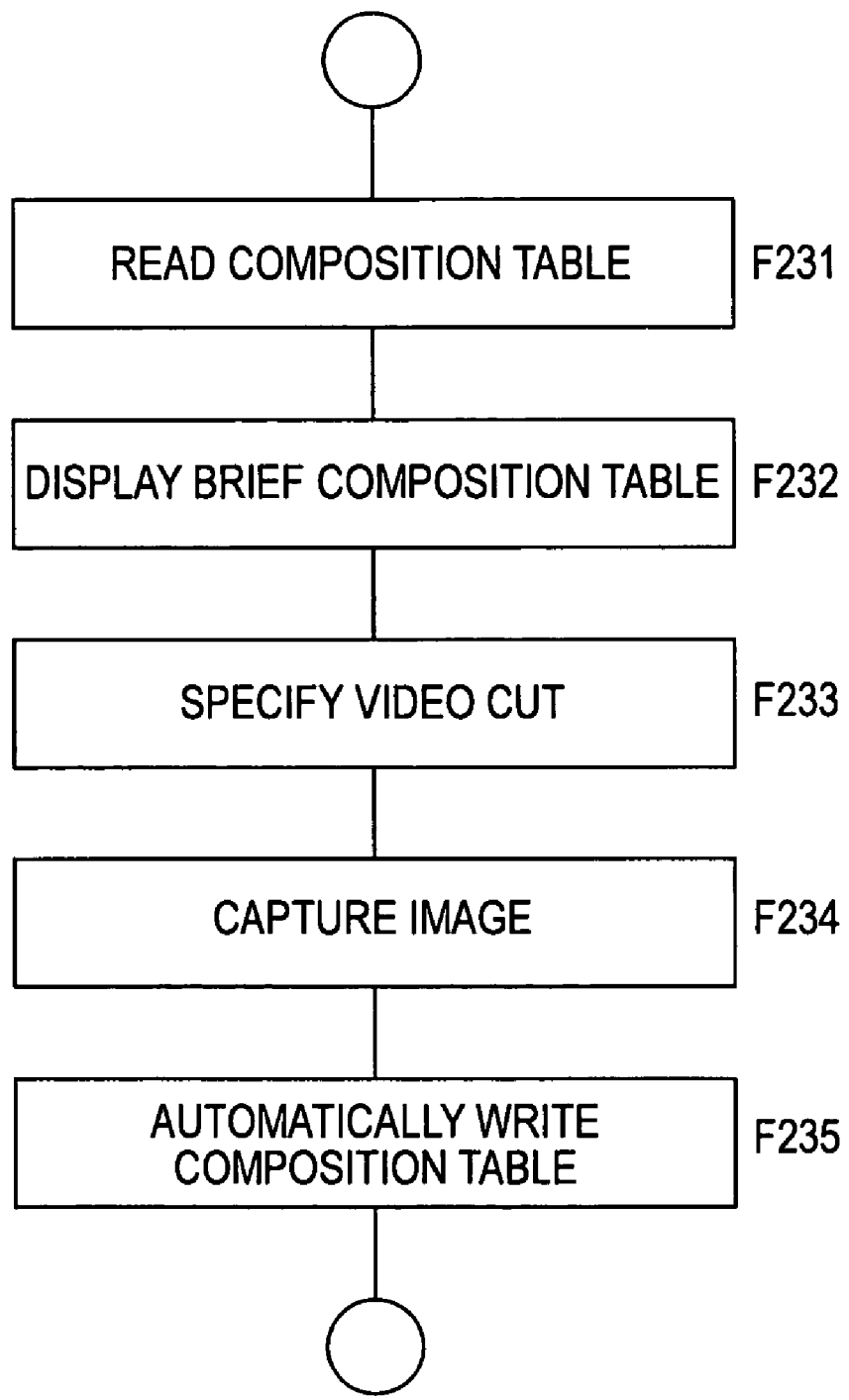
FIG. 18 is a flowchart of a video taking process of the image pickup device in accordance with the embodiment of the present invention.

FIG. 18 illustrates the composition table process at the material gathering phase of the image pickup device 1.

In step F231, the image pickup device 1 reads the composition table for material gathering (video taking). As is known from the above-referenced functions, to read the composition table, the image pickup device 1 directly accesses the composition table site 3 to download the composition table or the image pickup device 1 receives, via the external interface 20 or the communication unit 21, the composition table that is downloaded to the field PC 2. The read composition table is recorded on the disk 90.

The disk 90 having the composition table stored thereon can be loaded.

Upon acquiring the composition table, the system controller 11 of the image pickup device 1 displays the brief composition table in step F232. For example, the system controller 11 of the image pickup device 1 causes the viewfinder 31 to display the composition table with the content thereof simplified. If a display, such as a liquid-crystal panel, is included in the system of FIG. 5 (the display not shown), the composition table is displayed on the display.

FIG. 19 illustrates the content of the brief composition table.

Only the items of the scene K1, the cut K2, the planning intention K3, and the video K4 are shown. These items are those inputted by the planning and composition group. Viewing the composition table, a cameraman can recognize vides to be picked up.

In the brief composition table, selection keys SK1 and SK2, and cursors K1 and K2 are displayed so that the cameraman can select scenes and cuts.

In step F233, the system controller 11 determines the cuts to photographed, when the cameraman selects the scene and the cut to be photographed using the selection keys SK1 and SK2.

In step F234, the system controller 11 performs the video taking process in response to the operation of the cameraman.

In step F235, the system controller 11 automatically writes data onto the composition table subsequent to the video taking. In this case, the system controller 11 writes data to write-enabled items of the cut designated in step F233, namely, the camera posture and the camera parameter values in the items of the video K4, the audio K8, and the material gathering data K9.

The automatic writing to the composition table is performed on the composition table on the disk 90. At the time of the automatic writing, the composition table on the composition table site 3 can be manipulated with the system controller 11 logging on the composition table site 3, or the composition table subsequent to the automatic writing is uploaded to the composition table site 3.

Figure 20:
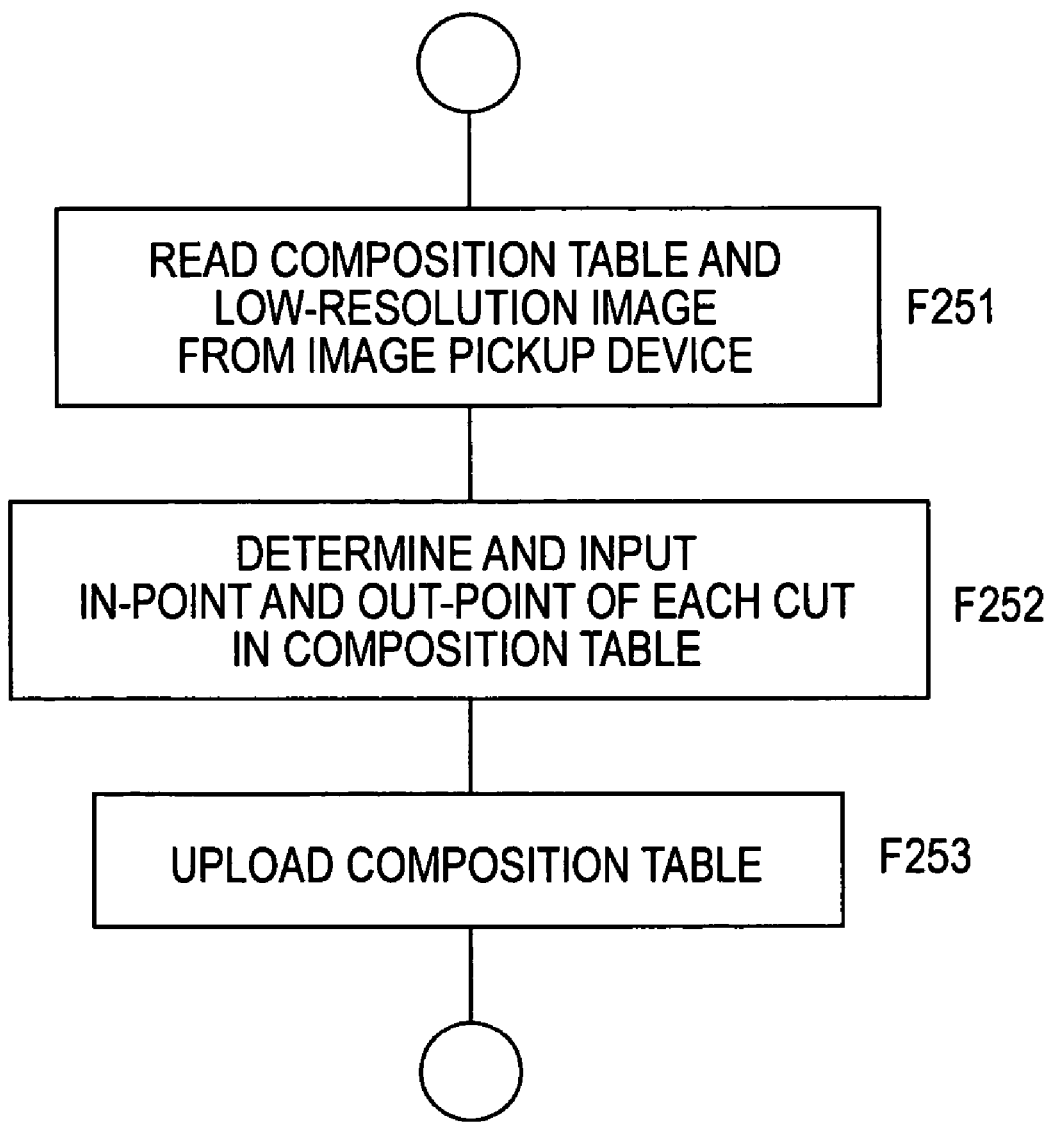
FIG. 20 is a flowchart of a pre-editing process performed by the field PC in accordance with the embodiment of the present invention.

The input process to the composition table performed by the field PC 2 in the material gathering in step S22 of FIG. 14 is described below with reference to FIG. 20.

After the video taking and the automatic writing to the composition table are performed in the process of FIG. 18, the field PC 2 reads the composition table and the low-resolution image from the image pickup device 1 in step F251.

Staff using the field PC 2 determines an IN point and an OUT point in step F252 while replaying the low-resolution moving image corresponding to the cut in the composition table, and inputs the determined IN and OUT points. In response, the field PC 2 inputs the IN point and the OUT point (such as the time code) to the composition table. For example, if sub items of the IN point and the OUT point are available in the item of the recording session of the material gathering and production information K6, the field PC 2 inputs the IN point and the OUT point there.

The brief edit information in the video taking field is thus inputted to the composition table. In step F253, the field PC 2 uploads the composition table to the composition table site 3.

As described above, one of the image pickup device 1 and the field PC 2 can automatically input the data to particular items of the composition table in the material gathering in step S22 of FIG. 14.

When the input process is performed to the composition table as shown in FIG. 16 in step S23, the input process to the composition table in the material gathering phase is complete.

The process flow of FIG. 14 is one basic example only, and other process flows are contemplated. Other process flows are shown in FIGS. 21 and 22.

Figure 21:
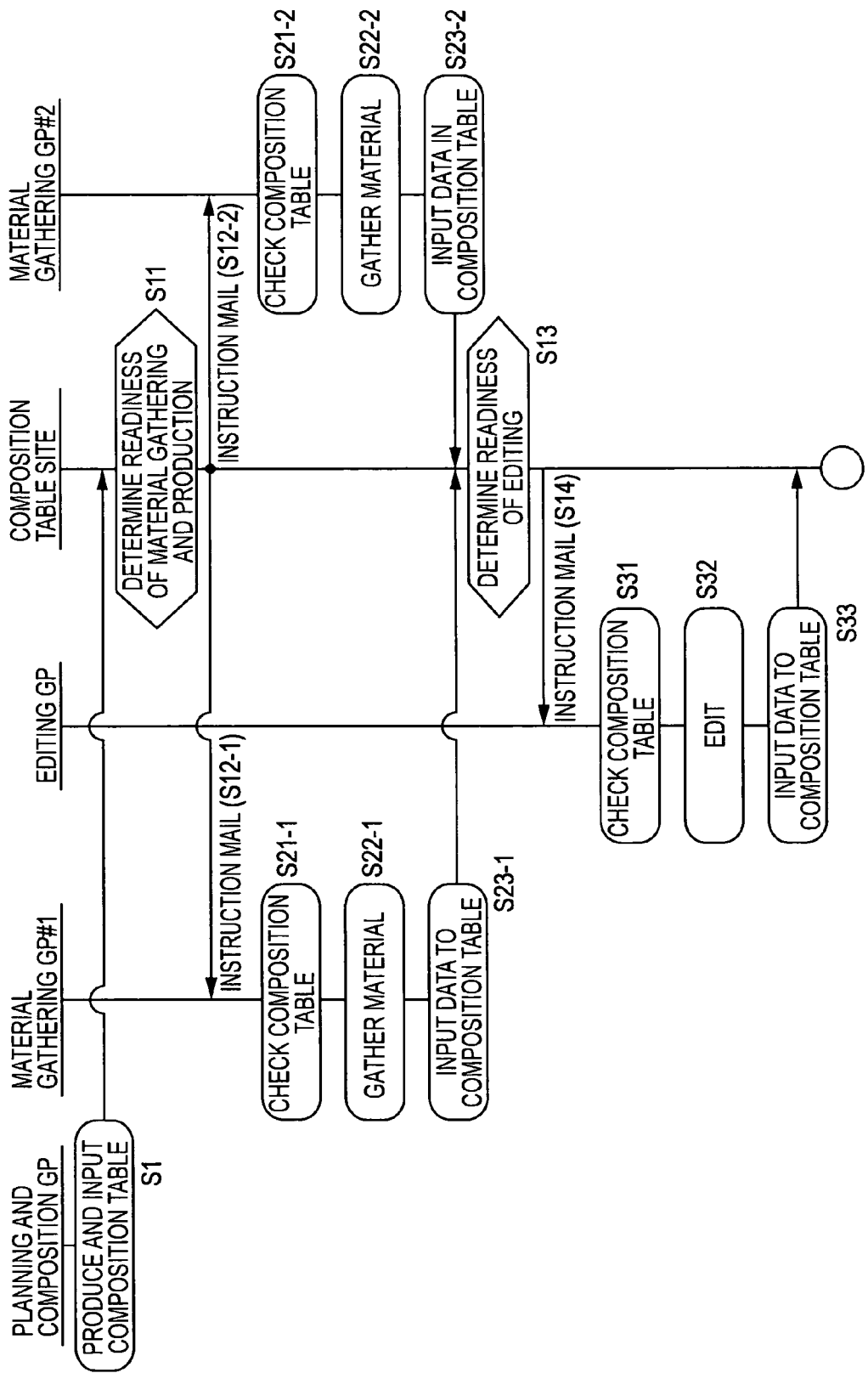
FIG. 21 illustrates a process flow of a plurality of material gathering groups in accordance with the embodiment of the present invention.
Figure 22:
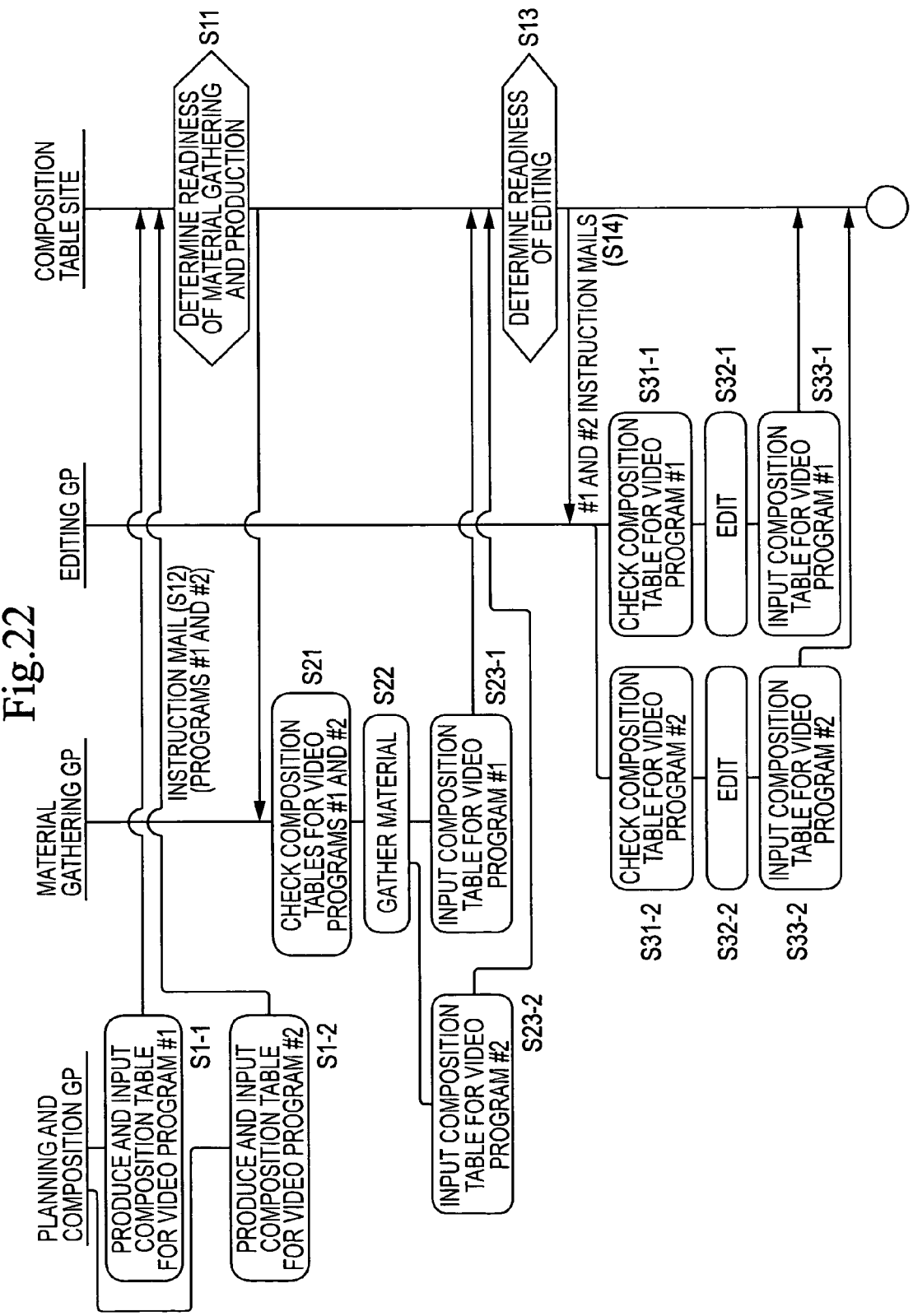
FIG. 22 illustrates a process flow of producing a plurality of programs in accordance with the embodiment of the present invention.

As shown in FIG. 21, a material gathering instruction is issued to a plurality of material gathering groups #1 and #2.

Step S1: The planning and composition group inputs data to required items so that the composition table contains respective instruction contents for the plurality of material gathering groups. For example, the data intended for a particular material gathering group is inputted on a per scene or cut basis. The composition table in the composition table site has the input content accounting for the intention of the planning and composition group.

Step S11: The composition table site determines the readiness of the material gathering and production based on a determination of whether the planning and composition group has inputted the "instruction mail transmission" to the particular material gathering group.

Step S12-1: The composition table site transmits the instruction mail to the material gathering group #1 in response to the input of the "instruction mail transmission" of the material gathering group #1 on the composition table.

Step S12-2: The composition table site transmits the instruction mail to the material gathering group #2 in response to the input of the "instruction mail transmission" of the material gathering group #2 on the composition table.

Steps S21-1 through S23-1: The material gathering group #1 views the composition table in response to the reception of the instruction mail, and checks the material gathering content such as the designated scene and cut. In accordance with the content posted in the composition table, the material gathering group #1 performs the material gathering operation, and inputs obtained data to the composition table. In this way, the material gathering results obtained by the material gathering group #1 are accounted for in the composition table.

Steps S21-2 through S23-2: The material gathering group #2 views the composition table in response to the reception of the instruction mail, and checks the material gathering content such as the designated scene or cut. In accordance with the content posted in the composition table, the material gathering group #2 performs the material gathering operation, and inputs obtained data to the composition table. In this way, the material gathering results obtained by the material gathering group #2 are accounted for in the composition table.

Step S13: The composition table site determines the readiness of the editing process based on a determination of whether the "edit OK mail" has been received from each of the material gathering groups #1 and #2.

Step S14: The composition table site transmits the instruction mail to the editing group in response to the inputting of the "edit OK mail" to the composition table from the material gathering groups #1 and #2.

Steps S31-S33: The editing group views the composition table in response to the reception of the instruction mail in the same manner as illustrated in FIG. 14, and checks the material gathering and production results and the objective of editing. The editing group performs the editing process based on the composition table. The results of editing are inputted to the composition table.

As shown in FIG. 22, a material gathering instruction of a plurality of plans (video programs #1 and #2) is issued to a single material gathering group.

Step S1-1: The planning and composition group produces a composition table for the video program #1, and inputs data to required items. The composition table in the composition table site has thus an input content accounting for the intention of the planning and composition group.

Step S1-2: The planning and composition group produces a composition table for the video program #2, and inputs data to required items. The composition table in the composition table site has thus an input content accounting for the intention of the planning and composition group.

Step S11: The composition table site determines the readiness of the material gathering and production in connection with the video programs #1 and #2 based on a determination of whether the planning and composition group has inputted the "instruction mail transmission".

Step S12: The composition table site transmits the instruction mail relating to the video program #1 to the material gathering group and the production group in response to the inputting of the "instruction mail transmission" relating to the video program #1 on the composition table. The composition table site also transmits the instruction mail relating to the video program #2 to the material gathering group and the production group in response to the inputting of the "instruction mail transmission" relating to the video program #2 on the composition table.

Step S21: The material gathering group views the composition table of the video program #1 and the composition table of the video program #2 in response to the reception of the instruction mail, and checks the content of the material gathering.

Step S22: The material gathering group performs the material gathering process in accordance with the content of the viewed composition table. For example, the material gathering group performs the material gathering process in accordance with the video programs #1 and #2.

Step S23-1: The material gathering group inputs data in response to the material gathering for the video program #1. In this way, the material gathering results are accounted for in the composition table of the video program #1.

Step S23-2: The material gathering group inputs data in response to the material gathering for the video program #2. In this way, the material gathering results are accounted for in the composition table of the video program #2. A video material captured at the same time can be used in the two video programs, depending on the content of each of the video programs #1 and #2.

Step S13: The composition table site determines the readiness of the editing process of the video programs #1 and #2, depending on a determination of whether the "edit OK mail" has been inputted by each of the material gathering group and the production group.

Step S14: The composition table site transmits an edit instruction mail of the video program #1 to the editing group in response to the inputting of the "edit OK mail" of the video program #1 to the composition table. The composition table site transmits an edit instruction mail of the video program #2 to the editing group in response to the inputting of the "edit OK mail" of the video program #2 to the composition table.

Step S31-1: The editing group views the composition table of the video program #1 in response to the reception of the instruction mail, and checks the material gathering and production results and the objective of the editing process.

Step S32-1: The editing process is performed based on the composition table of the video program #1.

Step S33-1: The editing group inputs data to the composition table of the video program #1 in response to the editing process. In this way, the editing results are accounted for in the composition table, and the video program #1 is completed.

Step S31-2: The editing group views the composition table of the video program #2 in response to the reception of the instruction mail, and checks the material gathering and production results and the objective of the editing process.

Step S32-2: The editing process is performed based on the composition table of the video program #2.

Step S33-2: The editing group inputs data to the composition table of the video program #2 in response to the editing process. In this way, the editing results are accounted for in the composition table, and the video program #2 is completed.

11. Modifications and Program

The embodiments of the present invention have been discussed. A specific system structure, an arrangement and functions of the terminal, a content of the composition table, and processes to the composition table other than those described above are contemplated.

A recordable and playable disk medium, such as a magneto-optical disk, and a phase-change recording disk, is preferred as the disk 90. Instead of the disk 90, another type of medium, such as a memory card containing a flash memory, may be used. Any medium can work as long as the medium having a capacity sufficient to store the video data can record and replay the video and audio data and the composition table data.

Figure 23A:
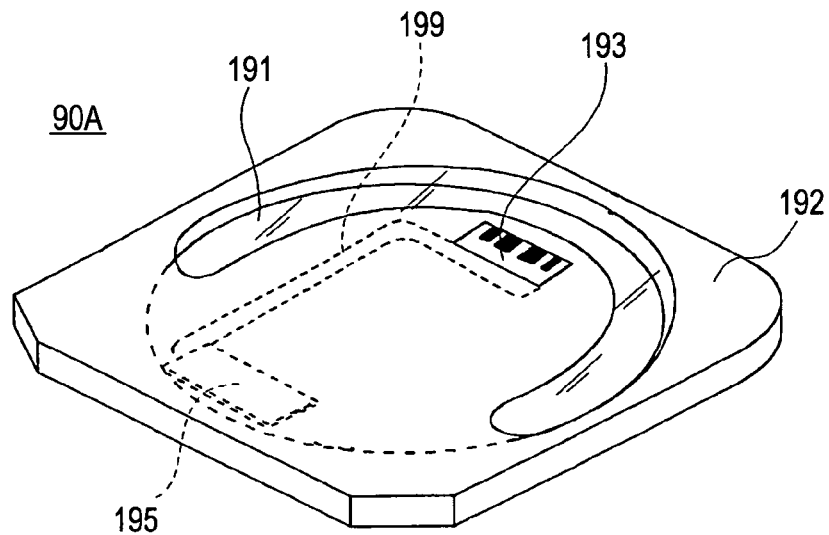
FIGS. 23A and 23B illustrate another disk in accordance with the embodiment of the present invention.
Figure 23B:
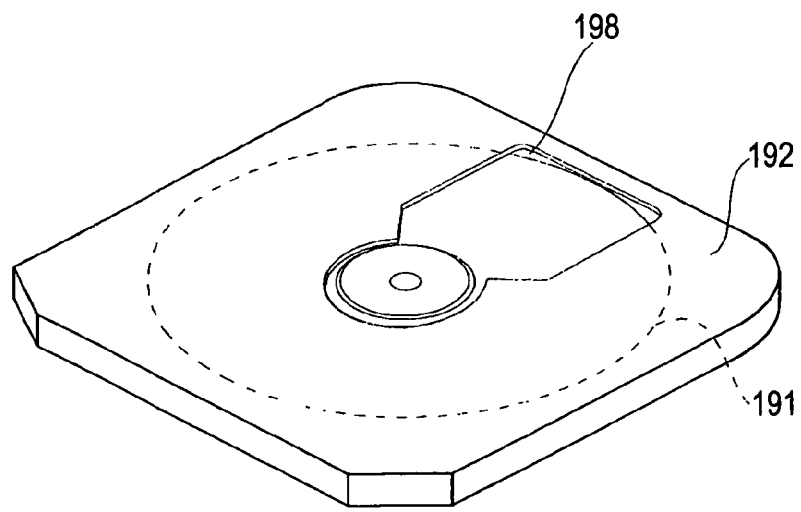

If the composition table data is stored together with the video and audio data on the disk 90 in the image pickup device 1, a cartridge disk 90A shown in FIGS. 23A and 23B is appropriate for use as the recording medium.

FIG. 23A is a perspective view of the cartridge disk 90A viewed from above, and FIG. 23B is a perspective view of the cartridge disk 90A viewed from below.

The cartridge disk 90A includes a substantially square flattened cartridge 192 and a disk 191 rotatably supported within the cartridge 192. The disk 191 may be an optical disk that records data using phase-change technique or a color-change technique, a magneto-optical disk that records data using a magnetic field modulation technique, or a magnetic disk.

An opening 198 is formed on the underside of the cartridge disk 90A as shown in FIG. 23B to expose the recording surface of the disk 191. A shutter may be arranged to close the opening 198 when the cartridge disk 90A is not loaded in the image pickup device 1 or the like.

An IC chip 195 is arranged within the cartridge 192. A terminal section 193 is exposed to the top surface of the cartridge 192. A flexible board 199 connects the terminal section 193 to the IC chip 195.

The IC chip 195 includes a interface circuit, a central processing unit (CPU), and a non-volatile memory such as a flash memory. Information is also written on the non-volatile memory.

The information is written to or read from the non-volatile memory by a device, such as the image pickup device 1 or the field PC 2, in which the cartridge disk 90A is loaded. More specifically, a connection terminal section is formed in the disk drive 51 of FIG. 4 or the disk drive 18 of FIG. 5 in alignment with the terminal section 193 to establish connection.

With the cartridge disk 90A, the composition table data can be stored in the non-volatile memory of the IC chip 195.

Accessing is possible to the composition table data independently of the recording and replaying of the video data on the disk 191. The flexibility of the writing, manipulation, and reading of the composition table data is increased.

The IC chip 195 can be arranged on a magnetic tape cartridge rather than on the disk. The video data may be recorded on the magnetic tape cartridge while the composition table data may be stored in the IC chip 195.

The IC chip 195 exchanges data with the terminal section 193 put into contact with terminals of an external device. If the IC chip 195 is a contactless IC having a radio interface, neither the terminal section 193 nor the flexible board 199 is required. In such a case, the image pickup device 1 is provided with a radio interface compatible with the contactless IC.

The program of the embodiment of the present invention is a program executed by a personal computer or an image pickup device, each having the functions of the above-referenced terminal.

The supply of the program is easy if a recording medium of the embodiment of the present invention storing the program of the present invention is used.

The program of the embodiment of the present invention can be stored beforehand in an HDD as a recording medium built in the personal computer or the image pickup device, or in a ROM of the CPU.

The program of the embodiment of the present invention can be stored (recorded) temporarily or permanently in a removable recording medium such as flexible disk, a CD-ROM (Compact Disk Read Only Memory), an MO (Magneto-optical) disk, a DVD (Digital Versatile Disk), a magnetic disk, or a semiconductor memory. The removable disk is thus supplied as package software.

The program of the embodiment of the present invention is installed from the removable recording medium to the personal computer. Furthermore, the program of the embodiment of the present invention can be downloaded to the personal computer from a download site via a network such as a LAN (Local Area Network) or the Internet.

The invention claimed is:

1. A video program production system for use in producing a video program, comprising a composition table site, and a plurality of terminals including program content gathering and program production terminals communicable with the composition table site, respective terminals being associated with and operated by respective operating groups to perform respective, predetermined different work assignments in accordance with a video production schedule and instructions in said composition table for producing said video program, said operating groups including a supervisory group,
wherein the composition table site comprises:
a video program database for storing video program content data inputted from said program content gathering and program production terminals,
storage means for storing composition table data containing updatable information describing successive tasks to be performed and completed by different ones of said operating groups required for the production of said video program and updatable instructions instructing respective ones of said operating groups to perform said tasks, said composition table data storing said video program production schedule and links to the video program content data stored in said video program database, and
a controller for providing the composition table data to each of the terminals, including the instructions and the information describing tasks to be performed and tasks completed by said different operating groups for viewing at each terminal, and for processing information input from the terminals to be added to the composition table data; and
wherein the predetermined work assignment performed by at least one group is dependent upon the work assignment performed by another group; and
wherein each terminal associated with and operated by each said operating group acquires the composition table data by communicating with the composition table providing apparatus, said terminal comprises:
the composition table data by communicating with the composition table providing apparatus,
display means for displaying the composition table data acquired by the acquisition means, including updated instructions, the tasks to be performed and the tasks completed by respective groups, such that the display means at the terminal of one operating group displays the tasks completed by said one operating group as well as the tasks completed by other operating groups, and said display means further displays instructions that have been updated as a result of the completion of tasks by another operating group,
input information generating means for generating information to be input to said composition table, said input information including end of task data representing the completion of the task performed by the operating group associated with said terminal, and input information transmitting means for transmitting the input information from said input information generating means to the composition table site to update the composition table that is stored at the composition table site and that is displayed at all of the terminals, whereby the terminals operated by all of said operating groups display the composition table updated by different ones of said operating groups and thereby the status of all of said operating groups;

whereby the display at a terminal associated with one operating group of said end of task data input in said composition table data from a different operating group instructs said one group to perform the next successive task in the work assignment performed by said one group following the task in the production schedule that has been completed by said different operating group, as determined by said composition table; and wherein the terminal associated with and operated by at least said supervisory group updates at least selected instructions dependent upon said information inputted to said composition table by an operating group.

2. A video program production system for use in producing a video program, comprising a composition table site, and a plurality of terminals including A/V content gathering and A/V editing terminals communicable with the composition table site, respective terminals being associated with and operated by respective operating groups to perform respective, predetermined different work assignments in accordance with a video production schedule and instructions in said composition table for producing said video program, said operating groups including a supervisory group, wherein the composition table site comprises:

storage means for storing composition table data containing updatable information describing audio and video (A/V) gathering and editing tasks to be performed and completed by A/V content gathering and A/V editing operating groups required for the production of said video program and updatable instructions instructing respective ones of said content gathering and editing operating groups to perform said tasks, an A/V database for storing audio and video content for said video program, said composition table data storing said video program production schedule and said instructions for the respective operating groups, and links to said audio and video content in said A/V database, and a controller for providing the composition table data to the terminals, including the instructions and the information describing tasks to be performed and tasks completed by said A/V content gathering and A/V editing operating groups for viewing at each terminal, and for processing information input from the terminals to be added to and update the composition table data; and wherein the predetermined work assignment performed by at least one group is dependent upon the work assignment performed by another group; and wherein each terminal associated with and operated by each said operating group acquires the composition table data by communicating with the composition table providing apparatus, said terminal comprises:

the composition table data by communicating with the composition table providing apparatus, display means for displaying the composition table data acquired by the acquisition means, including updated instructions, the A/V content gathering and editing tasks performed and completed by said operating groups, and for displaying said audio and video information when a link thereto in said composition table data is selected, such that the display means at the terminal of one operating group displays the tasks completed by said one operating group as well as the tasks completed by other operating groups and said display means further displays instructions that have been updated as a result of the completion of tasks by another operating group, input information generating means for generating information to be input to said composition table, said input information including end of task data representing the completion of the task performed by the operating group associated with said terminal, and input information transmitting means for transmitting the input information from said input information generating means to the composition table site to update the composition table that is stored at the composition table site and that is displayed at the terminals, whereby the terminals operated by all of said operating groups display the composition table updated by said operating groups and thereby the status of all of said operating groups;

whereby the display at a terminal associated with one operating group of information input in said composition table data from a different group representing the completion of a task by said different group instructs another group to perform the next successive task in the production schedule following the task that has been completed by said different operating group, as determined by said composition table; and wherein the terminal associated with and operated by at least said supervisory group updates at least selected instructions dependent upon said information inputted to said composition table by an operating group.

3. A video program production system for use in producing a video program, comprising a composition table site, and a plurality of terminals including program content gathering and program production terminals communicable with the composition table site, respective terminals being associated with and operated by respective operating groups to perform respective, different work assignments in accordance with a video production schedule and instructions in said composition table for producing video program, said operating groups including a supervisory group, wherein the composition table site comprises:

a video program database for storing video program content data inputted from said program content gathering and program production terminals, storage means for storing composition table data containing information describing successive tasks to be performed and completed by different ones of said operating groups required for the production of said video program and updatable instructions instructing respective ones of said content gathering and editing operating groups to perform said tasks, said composition table data storing said video program production schedule and links to the video program content data stored in said video program database, and said composition table data further containing updateable items, with each operating group having authorization to update only certain predetermined ones of said updatable items, and a controller for providing the composition table data to each of the terminals, including the instructions and the information describing tasks to be performed and tasks completed by said different operating groups for viewing at each terminal, and for processing said certain predetermined updatable items, input from the terminals of those authorized operating groups, to be added to the composition table data; and wherein the predetermined work assignment performed by at least one group is dependent upon the work assignment performed by another group; and wherein each terminal associated with and operated by each said operating group acquires the composition table data by communicating with the composition table providing apparatus, said terminal comprises:

the composition table data by communicating with the composition table providing apparatus, display means for displaying the composition table data acquired by the acquisition means, including updated instructions, the tasks to be performed and the tasks completed by respective authorized operating groups, such that the display means at the terminal of one operating group displays the tasks completed by said one operating group as well as the tasks completed by other operating groups, and said display means further displays instructions that have been updated as a result of the completion of tasks by another operating group, input information generating means for generating updatable items to be input to said composition table, said input information including end of task data representing the completion of the task performed by the operating group associated with said terminal, and input information transmitting means for transmitting the updatable items from said input information generating means to the composition table site so as to update the composition table that is stored at the composition table site and that is displayed at all of the terminals, whereby each terminal is enabled to access and add to said composition table data only certain predetermined updatable items from the authorized operating group whereby the terminals operated by all of said operating groups display the composition table updated by different ones of said operating groups and thereby the status of all of said operating groups;

whereby the display at a terminal associated with one operating group of said end of task data input in said composition table data from a different operating group instructs said one group to perform the next successive task in the work assignment performed by said one group following the task in the production schedule that has been completed by said different operating group, as determined by said composition table; and wherein the terminal associated with and operated by at least said supervisory group updates at least selected instructions dependent upon said information inputted to said composition table by an operating group.

4. A video program production system for use in producing a video program, comprising a composition table site, and a plurality of terminals including A/V content gathering and A/V editing terminals communicable with the composition table site, respective terminals being associated with and operated by respective operating groups to perform respective, predetermined different work assignments in accordance with a video production schedule and instructions in said composition table for producing said video program, said operating groups including a supervisory group, wherein the composition table site comprises:

storage means for storing updatable composition table data containing updatable information describing audio and video (A/V) gathering and editing tasks to be performed and completed by A/V content gathering and A/V editing operating groups required for the production of said video program and updatable instructions instructing respective ones of said A/V content gathering and A/V editing operating groups to perform said tasks, an A/V database for storing audio and video content for said video program, said composition table data storing said video program production schedule and links to said audio and video content in said A/V database, and a controller for providing the composition table data to each of the terminals, including the instructions and the information describing tasks to be performed and tasks completed by said A/V content gathering and A/V editing operating groups for viewing at each terminal, and for updating said composition table data with information input from at least some of the terminals; and wherein the predetermined work assignment performed by at least one group is dependent upon the work assignment performed by another group; and wherein each terminal associated with and operated by each said operating group acquires the composition table data by communicating with the composition table providing apparatus, said terminal comprises:

the composition table data by communicating with the composition table providing apparatus, display means for displaying the composition table data acquired by the acquisition means, including updated instructions and the A/V content gathering and editing tasks performed and completed by said operating groups, such that the display means at the terminal of one operating group displays the tasks completed by said one operating group as well as the tasks completed by other operating groups, and said display means further displays instructions that have been updated as a result of the completion of tasks by another operating group, and retrieving means for retrieving from said A/V database said audio and video information when a displayed link thereto in said composition table data is selected, and wherein the terminal used by an edit operating group performs an edit operation on at least said retrieved video information in accordance with said information in said displayed composition table data describing said editing tasks, thereby producing edited video information and includes an edit operation on at least said retrieved video information in accordance with said information in said displayed composition table data describing said editing tasks, thereby producing edited video information, input information generating means for generating edit information describing said edit operation to be input to said composition table, said input information including end of task data representing the completion of the task performed by the edit operating group, and transmitting means for transmitting the edit information and end of task data from said input information generating means to the composition table site for updating said composition table data that is stored at the composition table site and that is displayed at all of the terminals, whereby the terminals operated by all of said operating groups display the composition table updated by said edit operating group;

whereby the display at a terminal associated with another group of information input in said composition table data from said edit operating group representing the completion of a task by said edit operating group instructs said other group to perform the next successive task in the work assignment performed by said other group following the task in the production schedule that has been completed by said edit operating group, as determined by said composition table; and wherein the terminal associated with and operated by at least said supervisory group updates at least selected instructions dependent upon said information inputted to said composition table by an operating group.

5. A terminal for use by and associated with a respective operating group in a video program production system to communicate with a composition table site via a network, wherein a supervisory group and at least program content gathering and program production groups communicate with said composition table site and perform successive predetermined different work assignments in accordance with a video production schedule and instructions in said composition table to produce said video program, wherein the predetermined work assignment performed by at least one group is dependent upon the work assignment performed by another group, said terminal acquires said composition table which contains information describing successive tasks to be performed and completed by said program content gathering and program production groups required for the production of said video program and updatable instructions instructing respective ones of said operating groups to perform said tasks, said composition table storing said video program production schedule and links to video program content data stored in a video program database and inputted from said program content gathering and program production groups, display means for displaying the acquired composition table, including updated said terminal comprises: instructions, the tasks to be performed and the tasks completed by both said respective group and by other groups, such that the display means at the terminal of one operating group displays the tasks completed by said one operating group as well as the tasks completed by other operating groups, and said display means further displays instructions that have been updated as a result of the completion of tasks by another operating group, input information generating means for generating information to be input to said composition table, said input information including end of task data representing the completion of the task performed by said operating group associated with said terminal, and input information transmitting means for transmitting the input information from said input information generating means to the composition table site to update the composition table that is stored at the composition table site and that is displayed on all of the terminals used by the groups, whereby the terminals used by all of said operating groups display the composition table updated by different ones of said operating groups and thereby the status of all of said operating groups;

whereby the display at a terminal associated with one operating group of said end of task data input in said composition table from a different operating group instructs said one group to perform the next successive task in the work assignment performed by said one group following the task in the production schedule that has been completed by said different operating group, as determined by said composition table; and wherein the terminal associated with and operated by at least said supervisory updates at least selected instructions dependent upon said information inputted to said composition table by an operating group.

6. A terminal for use by and associated with a respective one of several operating groups in a video program production system to communicate with a composition table site via a network, wherein a supervisory group and at least program content gathering and program production groups communicate with said composition table site and perform successive predetermined, different work assignments in accordance with a video production schedule and instructions in said composition table to produce said video program, wherein the predetermined work assignment performed by at least one group is dependent upon the work assignment performed by another group, said terminal acquires said composition table which contains information describing successive tasks to be performed and completed by at least said program content gathering and program production groups required for the production of said video program and updatable instructions instructing respective ones of said operating groups to perform said tasks, said composition table storing said video program production schedule and links to video program content data stored in a video program database and inputted from said program content gathering and program production groups, said composition table further containing updatable items, with each operating group having authorization to update only certain predetermined ones of said updatable items, display means for displaying the acquired composition table, including updated said terminal comprises: instructions, the tasks to be performed and the tasks completed by all of the authorized operating groups, such that the display means at the terminal of one operating group displays the tasks completed by said one operating group as well as the tasks completed by other operating groups, and said display means further displays instructions that have been updated as a result of the completion of tasks by another operating group, input information generating means for generating updatable items to be input to said composition table, said input information including end of task data representing the completion of the task performed by said respective group associated with said terminal, and input information transmitting means for transmitting the updatable items from said input information generating means to the composition table site for updating the composition table that is stored at the composition table site and that is displayed on all of the terminals used by the groups, whereby the terminal is enabled to add to said composition table only certain predetermined updatable items from the authorized operating group whereby the terminals operated by all of said operating groups display the composition table updated by different ones of said authorized operating groups and thereby the status of all of said operating groups;

whereby the display means at said terminal associated with one operating group displays the completion of a task performed by another, different operating group to instruct said one operating group to perform the next successive task in the work assignment performed by said one operating group following the task in the production schedule that has been completed by said different group, as determined by said composition table; and wherein the terminal associated with and operated by at least said supervisory group updates at least selected instructions dependent upon said information inputted to said composition table by an operating group.

7. A terminal for use by an edit operating group in a video program production system to communicate with a composition table site and with an audio/video (A/V) database, said terminal acquiring a composition table containing updatable a composition table containing updatable information describing A/V gathering and editing tasks to be performed and completed in a predetermined order by at least A/V content gathering and A/V editing operating groups required for the production of a video program as determined by a video production schedule, said composition table storing said video program production schedule and updatable instructions for the respective operating groups to perform successive different work assignments in accordance with said production schedule and said instructions, and said composition table further containing links to audio and video information in said A/V database, wherein the predetermined work assignment performed by at least one group is dependent upon the work assignment performed by another group; said terminal comprises:

display means for displaying the acquired composition table, including the A/V content gathering and editing tasks performed and completed by said A/V content gathering and A/V editing operating groups, such that the display means at the terminal of one operating group displays the tasks completed by said one operating group as well as the tasks completed by other operating groups, and said display means further displays instructions that have been updated as a result of the completion of tasks by another operating group, retrieving means for retrieving from said A/V database said audio and video information when a displayed link thereto in said composition table is selected, transmitting means for transmitting the edit information and end of task data from said edit information generating means to the composition table site for updating said composition table stored at said composition table site, whereby the terminal performs an edit operation on at least said retrieved video information in accordance with said information and said instructions in said displayed composition table describing said editing tasks, thereby producing edited video information, whereby the terminal generates edit information describing said edit operation to be input to said composition table and end of task data representing the completion of the task performed by the edit operating group whereby the terminals operated by all of said operating groups display the composition table updated by said edit operating group;

whereby the display means at said terminals operated by all of said operating groups display the completion of a task performed by the edit operating group to instruct another, different operating group to perform the next successive task in the work assignment performed by said different group following the task in the production schedule that has been completed by said edit operating group, as determined by said composition table; and wherein the terminal associated with and operated by at least a supervisory group updates at least selected instructions dependent upon said information inputted to said composition table by an operating group.

* * * * *